United States Patent
Pan et al.

(10) Patent No.: US 11,632,809 B2
(45) Date of Patent: Apr. 18, 2023

(54) METHOD AND APPARATUS FOR HANDLING SIDELINK IDENTIFIER CHANGE IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 319 days.

(21) Appl. No.: 16/844,434

(22) Filed: Apr. 9, 2020

(65) Prior Publication Data
US 2020/0329513 A1 Oct. 15, 2020

Related U.S. Application Data

(60) Provisional application No. 62/833,619, filed on Apr. 12, 2019.

(51) Int. Cl.
*H04W 4/00* (2018.01)
*H04W 76/11* (2018.01)

(52) U.S. Cl.
CPC .................. *H04W 76/11* (2018.02)

(58) Field of Classification Search
CPC ....... H04W 4/70; H04W 76/14; H04W 92/18; H04W 4/40; H04W 4/46; H04L 67/104
See application file for complete search history.

(56) References Cited

U.S. PATENT DOCUMENTS

| 2019/0090107 A1 | 3/2019 | Kim et al. |
| 2020/0260512 A1* | 8/2020 | Cheng ..................... H04W 4/40 |
| 2021/0211870 A1* | 7/2021 | Perras ..................... H04L 69/00 |

FOREIGN PATENT DOCUMENTS

CN 109496402 A 3/2019

OTHER PUBLICATIONS

Office Action from Taiwan Patent Office in corresponding TW Application No. 109112080, dated Dec. 17, 2020.
(Continued)

*Primary Examiner* — Omoniyi Obayanju
(74) *Attorney, Agent, or Firm* — Skaar Ulbrich Macari, P.A.

(57) ABSTRACT

A method and device are disclosed from the perspective of a first UE (User Equipment) for changing sidelink identity for a sidelink unicast link associated with a second UE. In one method, the method includes the first UE establishing the sidelink unicast link with the second UE, wherein a first lower-layer identity of the first UE and a second lower-layer identity of the second UE are used for communicating between the first UE and the second UE via the sidelink unicast link. The method also includes the first UE transmitting a Link Identifier Update Request message to the second UE, wherein the Link Identifier Update Request message includes a new first lower-layer identity of the first UE or information for deriving the new first lower-layer identity. The method further includes the first UE receiving a Link Identifier Update Response message from the second UE. In addition, the method includes the first UE continuing to use the first lower-layer identity for receiving sidelink data from the second UE until a sidelink data frame with the new first lower-layer identity is received from the second UE.

16 Claims, 16 Drawing Sheets

(56) References Cited

OTHER PUBLICATIONS

Interdigital, "TS 23.287 Unicast for V2X communication over PC5 reference point", Work Item/Release: eV2XARC/Rel-16, S2-1901749, SA WG2 Meeting #131, Feb. 25-Mar. 1, 2019, Tenerife, Spain.

European Search Report from corresponding EP Application No. 20168866.0, dated Aug. 20, 2020.

InterDigital et al.: "Update of Link Identifier Update for Unicast Link Procedure", 3GPP Draft, S2-2002019R10, 3rd Generation Partnership Project (3GPP), Mobile Competence Centre; 650, Route Des Lucioles; F-06921 Sophia-Antipolis Cedex; France, Feb. 26, 2020, XP051857873.

InterDigital et al.: "Corrections to Link Identifier Update Procedure", 3GPP Draft, S2-2003194, 3rd Generation Partnership Project (3GPP), Mobile Competence Centre, 650, Route Des Lucioles, F-06921, Sophia-Antipolis Cedex; France, Apr. 10, 2020, XP051874690.

InterDigital, "TS 23.287 Unicast for V2X Communication over PC5 reference point", 3GPP Draft, S2-1901749, Mobile Competence Centre, 650, Route Des Lucioles, F-06921, Sophia-Antipolis CED; Feb. 19, 2019, XP051610348.

LG Electronics, Motorola Mobility, Lenovo, Convida Wireless, InterDigital, OPPO, vivo Mobile Communications Co., LTD, "TS 23.287 Procedure for PC5 unicast", 3GPP Draft, S2-1904432, Mobile Competence Centre, 650, Route Des Lucioles; F-06921 Sophia-Antipolis Cedex; France, Apr. 11, 2019, XP051703728.

Office Action from Intellectual Property India from corresponding IN Application No. 202014015501, dated Jun. 21, 2021.

InterDigital, "TS 23.287 Unicast for V2X communication over PC5 reference point," Agenda Item 6.6, S2-1901749, SA WG2 Meeting #131, Feb. 25-Mar. 1, 2019, Tenerife, Spain.

LG Electronics, Motorola Mobility, Lenovo, Convida Wireless, InterDigital, OPPO, vivo Mobile Communications Co. LTD, "TS 23.287 Procedure for PC5 unicast,"Agenda Item 6.6, S2-1904432, SA WG2 Meeting #132, Apr. 8-12, 2019, Xi'an, China.

Notice of Submission of Opinion from Korean Intellectual Property Office in corresponding KR Application No. 10-2020-0043090, dated Jun. 30, 2021.

LG Electronics et al., "TS 23.287 Procedure for PC5 Unicast", Agenda Item: 6.6, Work Item/Release: eV2XARC/Rel-16, S2-1904432, SA WG2 Temporary Document, SA WG2 Meeting #132, Apr. 8-12, 2019, Xi'an, China.

InterDigital, TS 23.287 Unicast for V2X Communication over PC5 reference point, Agenda Item: 6.6, Work Item/Release: eV2XARC / Rel-16, S2-1901749, SA WG2 Temporary Document, SA WG2 Meeting #131, Feb. 25-Mar. 1, 2019, Tenerife, Spain.

Office Action to the corresponding Chinese Patent Application rendered by the State Intellectual Property Office (SIPO) dated Oct. 10, 2022, 7 pages.

\* cited by examiner

US 11,632,809 B2

METHOD AND APPARATUS FOR HANDLING SIDELINK IDENTIFIER CHANGE IN A WIRELESS COMMUNICATION SYSTEM

CROSS-REFERENCE TO RELATED APPLICATIONS

The present application claims the benefit of U.S. Provisional Patent Application Ser. No. 62/833,619 filed on Apr. 12, 2019, the entire disclosure of which is incorporated herein in their entirety by reference.

FIELD

This disclosure generally relates to wireless communication networks, and more particularly, to a method and apparatus for handling sidelink identifier change in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first UE (User Equipment) for changing sidelink identity for a sidelink unicast link associated with a second UE. In one method, the method includes the first UE establishing the sidelink unicast link with the second UE, wherein a first lower-layer identity of the first UE and a second lower-layer identity of the second UE are used for communicating between the first UE and the second UE via the sidelink unicast link. The method also includes the first UE transmitting a Link Identifier Update Request message to the second UE, wherein the Link Identifier Update Request message includes a new first lower-layer identity of the first UE or information for deriving the new first lower-layer identity. The method further includes the first UE receiving a Link Identifier Update Response message from the second UE. In addition, the method includes the first UE continuing to use the first lower-layer identity for receiving sidelink data from the second UE until a sidelink data frame with the new first lower-layer identity is received from the second UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TR 23.786 V1.0.0, "Study on architecture enhancements for EPS and 5G System to support advanced V2X services"; TS 36.300 V15.3.0, "Evolved Universal Terrestrial Radio Access (E-UTRA) and Evolved Universal Terrestrial Radio Access Network (E-UTRAN); Overall description"; and TS 23.303 V15.1.0, "Proximity-based services (ProSe)". The standards and documents listed above are hereby expressly incorporated by reference in their entirety.

Figure 1:
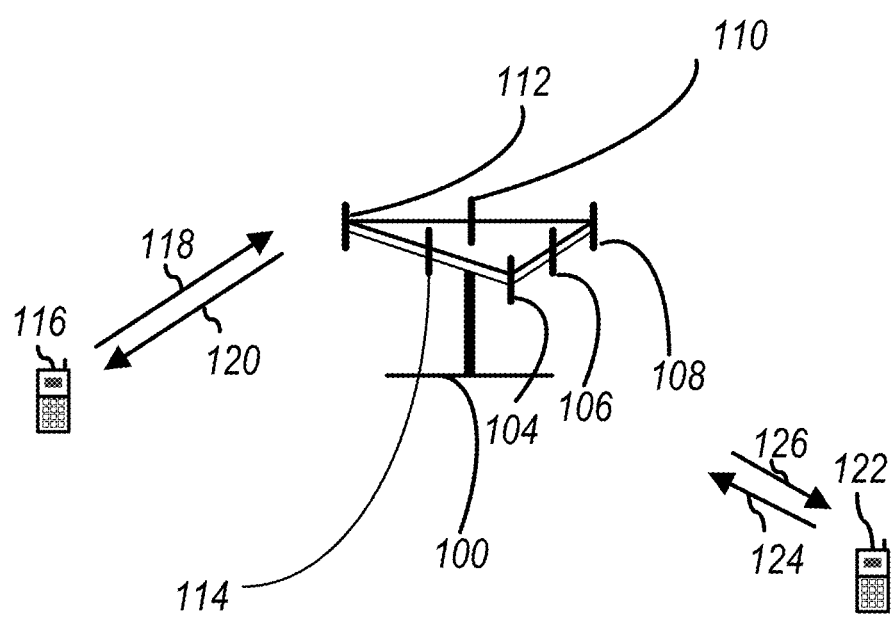
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group.

Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
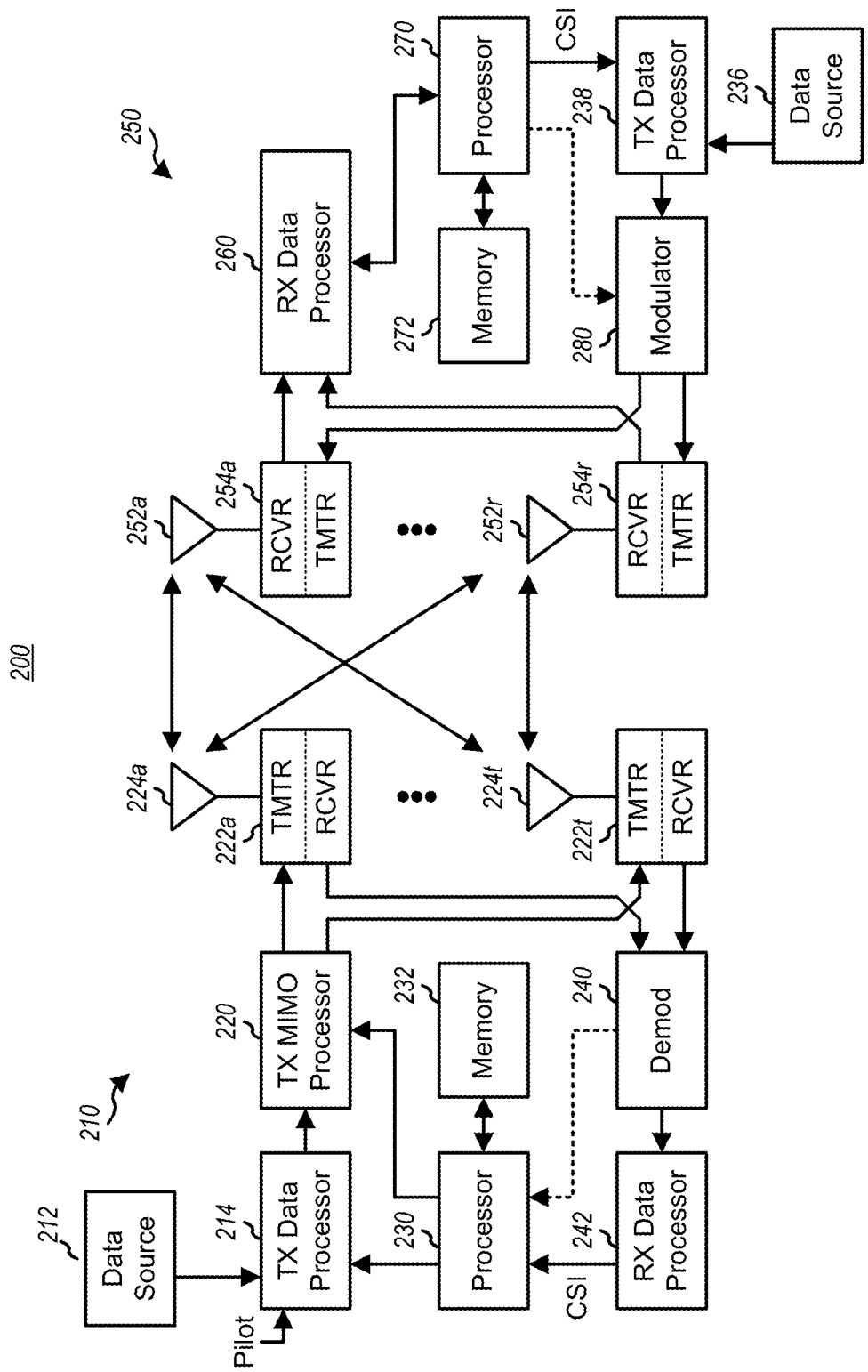
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
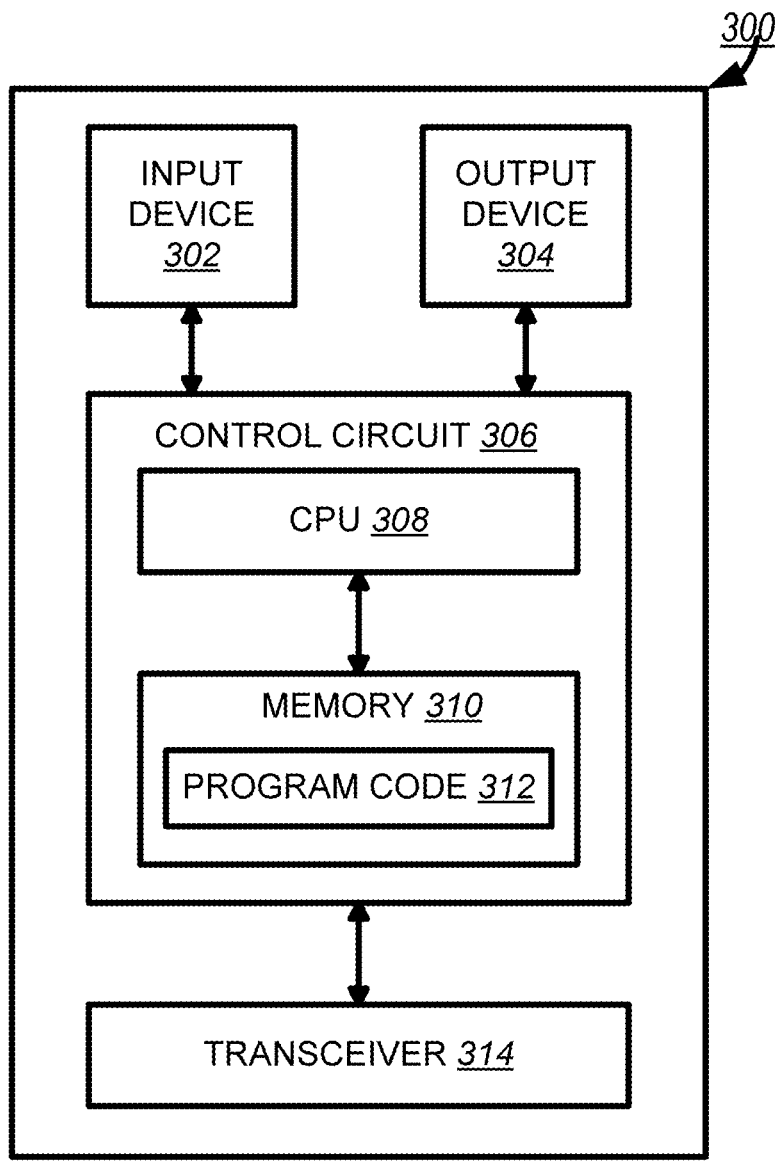
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
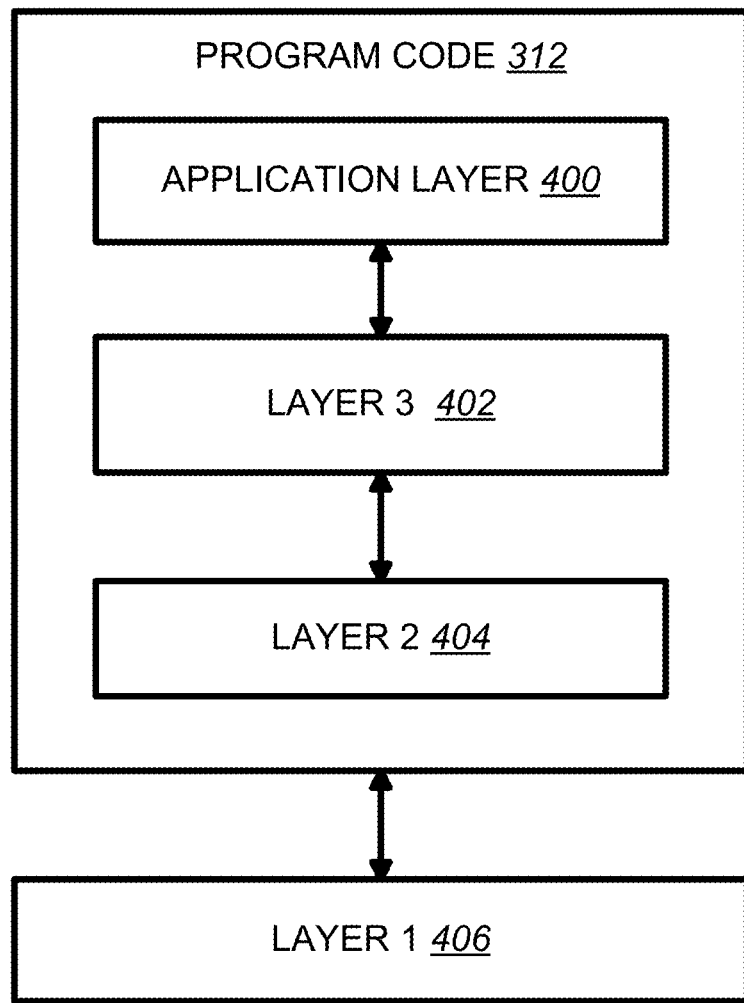
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TR 23.786 V1.0.0 introduced the following solutions for eV2X (enhanced Vehicle to Everything) communications as follows:

6.11 Solution #11: Solution for Unicast or Multicast for eV2X Communication Over PC5 Reference Point
6.11.1 Functional Description This solution addresses Key Issue #1 on the support of eV2X Group Communication, Key Issue #9 on the support of the unicast/multicast communication over PC5 and Key Issue #4 on the support of PC5 QoS framework enhancement for eV2X, focusing on the following aspects:

Identifiers for the unicast communication, e.g. L2 ID;
Signalling protocol to support unicast/multicast communication;
QoS support and AS layer configurations;
Security associations;
Procedures for the link establishment and maintenance.

6.11.2 Solution Description
6.11.2.1 Identifiers for the unicast communication
6.11.2.1.1 Separate L2 ID address space for unicast and multicast from those for broadcast One of the essential identifiers for the unicast/multicast communication is the L2 ID. As of the ProSe design in TS 23.303 [8], the destination L2 ID address space for one-to-one communication and one-to-many communications are separate with AS layer mechanism, i.e. MAC layer version number. This is done to avoid conflicts of the address used that may cause harm to one-to-one communications. In a similar manner, V2X unicast should also use the separate L2 IDs than that for the broadcast and multicast.

This separation applies to both destination L2 ID and source L2 ID. For a UE that has both broadcast and unicast/multicast traffic, different L2 IDs should be used with corresponding formats. The source L2 ID will be used by peer UE as the destination L2 ID in unicast communication. Details of the related L2 ID management for unicast/multicast is described in following clauses.

The UE may use distinct source L2 ID for different unicast one to one communication link e.g. when different unicast links are associated with different upper layer identifiers.

6.11.2.1.2 Deciding the Destination L2 ID to Use for Unicast/Multicast Communication
6.11.2.1.2.1 Option a In TS 23.285 [5], the Destination L2 ID is decided by the UE based on a configured mapping between PSID/ITS-AID to the L2 ID. This suites for broadcast traffic, but does not work for unicast or multicast traffic. In unicast or multicast, destination L2 ID would not be decided based on PSID/ITS-AID. A V2X UE should be allowed to have multiple unicast connections or multicast groups supported simultaneously for a particular service (PSID/ITS-AID). Therefore, the destination L2 ID information in this case should come from the upper layer. This means that the interface between the V2X layer and upper layer needs to be enhanced to allow such information to be passed down together with the data packet.

It is expected that the actual V2X applications do not understand the notion of L2 ID, as the applications can be built for cross technology or platforms. Therefore, some mid-ware layer within the UE has to translate the identifier used by the application layer, e.g. Station ID, to the V2X L2 ID. It means such mid-ware layer needs to maintain the mapping of application layer destination identifiers and L2 IDs. Since this mid-ware layer is out of scope of SA2, in the specification it can be noted as "upper layer" in general, and the assumption that this "upper layer" maintains the mapping and provides the L2 ID for unicast or multicast communication should be documented.

6.11.2.1.2.2 Option B

An alternative to the above solution is for the V2X layer to manage such unicast link/multicast group to L2 ID mapping. In that case, the unicast link/multicast group can be allocated with a flow identifier at the time of establishment. Corresponding connection profile information, e.g. L2 IDs, transmission settings, QoS parameters, etc., could be associated with it. In such a case, the upper layer only needs to use the flow identifier to indicate the destination and pass it down with the data packet. V2X layer will apply the associated profile information, including the L2 IDs, for the transmission. This would allow the reuse the Uu link handling mechanisms, e.g. similar to that of the QoS Flows, and be more extensible. Again, the translation of the application layer identifiers, e.g. Station ID, to this flow identifier has to be done by this mid-ware layer, i.e. the "upper layer".

6.11.2.2 Signalling Protocol to Support Unicast/Multicast Communication

For unicast or multicast communication, there is a need for some control message exchanged between the UEs involved in order to establish the link or group. Therefore, some signalling protocol is required.

In ProSe one-to-one communication defined in TS 23.303 [8], a PC5 Signalling Protocol (clause 5.1.1.5.2) was introduced, which runs over PDCP layer. Although it is defined for ProSe use, the messages could be extended in order to be used for V2X communication. The detailed protocol design needs to be reviewed based on the actual unicast operation procedures.

Another alternative approach is to run RRC over PC5. As PC5 Signalling Protocol is used over PDCP anyway, RRC protocol can be used to replace it. Although not all RRC features are required for PC5 operation, those selected V2X relevant RRC messages can be extended and used, e.g. SidelinkUEInformation, etc. The advantage of that is the potential unification of control signalling protocols for Uu and PC5.

Therefore, in this solution a signalling protocol over PC5 for the unicast/multicast communication management is introduced.

6.11.2.3 QoS Support and AS Layer Configurations

It is desirable that QoS can be support over the unicast and multicast communication as well.

In TS 23.285 [5], the QoS model for V2X communication is based on the per packet model, e.g. PPPP and PPPR. With unicast or multicast communication, it should be discussed whether a connection-oriented QoS model similar to that of Uu connection should be supported as well.

As also discussed in Key Issue #4 "Support of PC5 QoS framework enhancement for eV2X", something more than existing PPPP and PPPR is expected be required.

Specifically for unicast or multicast, due to the link or group involved, most packets sent over the same unicast link between a pair of peers should have the same QoS characteristics. This is closer to the Uu connection model, rather than the normal broadcast based traffic. Therefore, Uu type of QoS management concept can be reused here. This allow a unified model for Uu and PC5.

In addition, there could be different AS layer features that may be optional or not backward compatible. Therefore, when setting up the unicast link, such configuration could be also negotiated and configured together with/or as part of the QoS profile.

NOTE: The QoS Model for unicast described in Solution #19 (clause 6.19) is used.

6.11.2.4 Security Associations

The unicast or multicast communication may need protection at link layer as well. The ProSe one-to-one communication supports secure L2 link establishment, as defined in TS 33.303 [11].

However, within V2X communication context, each UE has the corresponding certificates for the security protection. Therefore, there may be a need to enhancement or adjust the existing L2 secure link establishment protocol in order to support the use of such security associations.

The exact security handling should be analysed and decided by SA3. SA2 design needs to be aligned with those decisions when available.

6.11.2.5 Procedures for the Link Establishment and Maintenance

TS 23.303 [8] has defined the procedures for the establishment and maintenance of secure L2 link over PC5, as in clause 5.4.5. These procedures can be enhanced and adapted for the V2X use, subject to the decisions above regarding signalling protocol choice, security handling, etc.

Some addition considerations for the V2X for the link/group handling is required though. For V2X communication, not all UEs will be supporting or use unicast communication. In addition, not all services may be run over the same channel or RAT (e.g. LTE V2X vs. NR V2X). With V2X, there is no discovery channel like that of ProSe (i.e. PC5-D), and there is no assumption on the configuration from network as that of Public Safety use. Therefore, in order to support the link establishment, there is a need for service announcement in order to inform the peer of the existence of the UE and the capability of the UE for the unicast communication, e.g. channel to operate, or the services supported, etc.

Such a service announcement should be made accessible to all the UEs that are interested in using the service. For example, such announcement could be either configured to send over a dedicate channel, similar to how WAVE Service Advertisement (WSA) is handled, or to be piggybacked on the periodical messages from the supporting UEs.

NOTE 1: Service announcement is handled by upper layer and out of scope of SA2. For layer 2 link maintenance, keep-alive functionality is needed to detect that when the UEs are not in direct communication range, so that they can proceed with implicit layer 2 link release.

NOTE 2: It is left to Stage 3 to determine how keep-alive functionality is supported.

6.11.3 Procedures 6.11.3.1 Establishment of Layer 2 Link Over PC5

Layer-2 link establishment procedure as defined in TS 23.303 [8] clause 5.4.5.2 can be reused for the eV2X unicast link establishment, with the following adaptations:

The messages may be converted to RRC signaling message instead of PC5 signaling message, depends on RAN WG's decision.

"UE oriented layer 2 link establishment" operates as below and Figure 6.11.3.1-1 shows the procedure:

The Direct Communication Request message can be sent by UE-1 with broadcast mechanism, i.e. to a broadcast address associated with the application instead of the L2 ID of UE-2. The upper identifier of UE-2 is included in the Direct Communication Request message to allow UE-2 to decide on if to respond to the request. The Source L2 ID of this message should be the unicast L2 ID of the UE-1.

The Direct Communication Request message should be transmitted using default AS layer setting e.g. broadcast setting, that can be understood by UE-2.

UE-2 uses the source L2 ID of the received Direct Communication Request message as destination L2 ID in the subsequent signalling to UE-1, and uses its own unicast L2 ID as the source L2 ID. UE-1 obtains UE-2's L2 ID for future communication, for signalling and data traffic.

Figure 5:
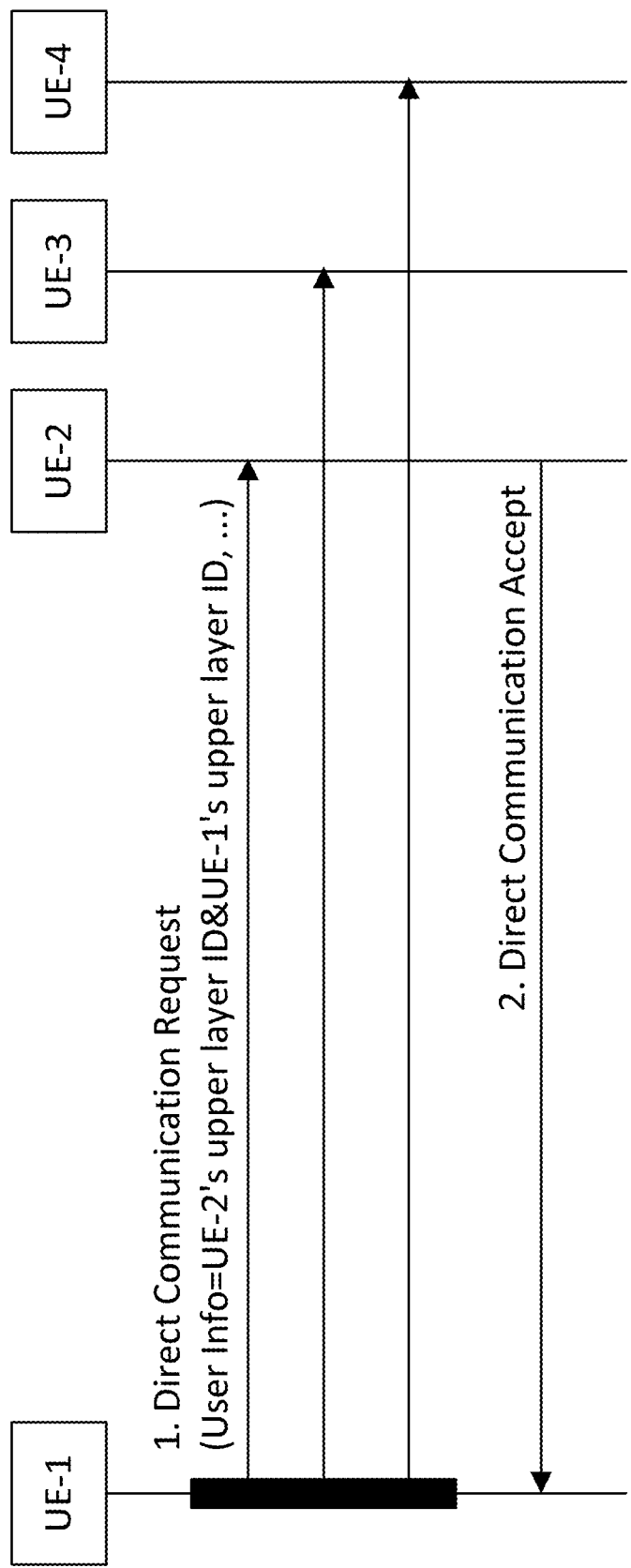
FIG. 5 is a reproduction of Figure 6.11.3.1-1 of 3GPP TR 23.786 V1.0.0.
Figure 6:
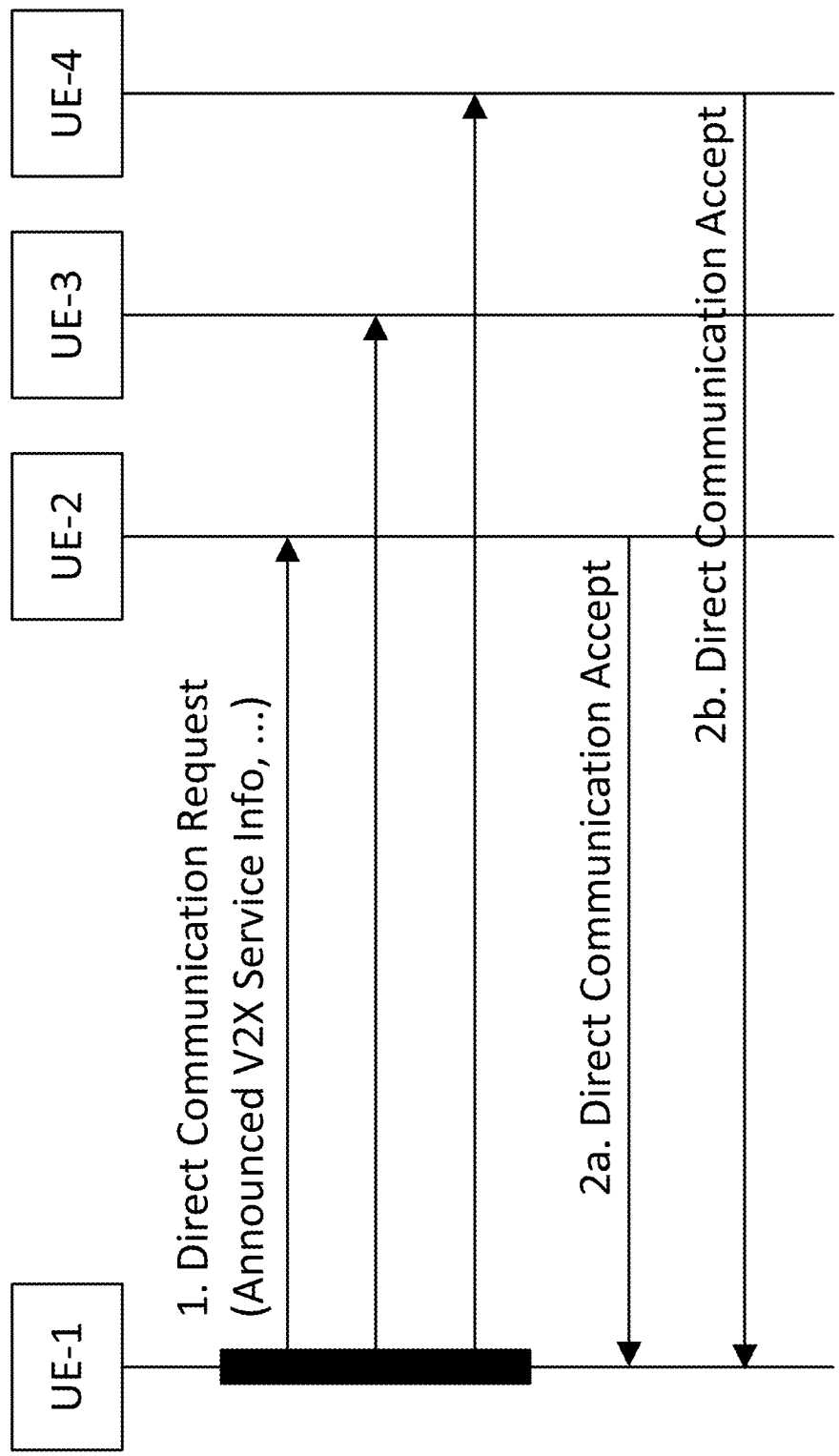
FIG. 6 is a reproduction of Figure 6.11.3.1-2 of 3GPP TR 23.786 V1.0.0.

[Figure 6.11.3.1-1 of 3GPP TR 23.786 V1.0.0, entitled "UE oriented layer 2 link establishment procedure", is reproduced as FIG. 5]

"V2X Service oriented layer 2 link establishment" operates same to the "UE oriented layer 2 link establishment" with the following differences and Figure 6.11.3.1-2 shows the procedure:

The information about V2X Service requesting L2 link establishment, i.e. information about the announced V2X Service is included in the Direct Communication Request message to allow other UEs to decide on if to respond to the request.

The UEs that are interested in using the V2X Service announced by the Direct Communication Request message can respond to the request (UE-2 and UE-4 in Figure 6.11.3.1-2).

After establishing layer 2 link with other UE(s) as described above, new UE(s) can enter proximity with UE-1, i.e. UE-1's direct communication range. In this case, UE-1 may initiate V2X Service oriented layer 2 link establishment procedure as it is aware of new UE(s) from Application Layer messages sent by the UE(s). Or the new UE may initiate V2X Service oriented layer 2 link establishment procedure. Therefore, UE-1 does not have to keep sending a Direct Communication Request message periodically to announce the V2X Service it wants to establish L2 link with other UE for unicast.

[Figure 6.11.3.1-2 of 3GPP TR 23.786 V1.0.0, entitled "V2X Service oriented layer 2 link establishment procedure, is reproduced as FIG. 6]

The layer 2 link supports the non-IP traffic. No IP address negotiation and allocation procedure would be carried out.

6.11.3.2 Contents of the signalling message for link establishment

The information carried in Direct Communication Request message defined in TS 24.334 [13] requires at least the following updates:

For "UE oriented layer 2 link establishment",

The User Info needs to include the target UE's ID (UE-2's upper layer ID), besides the initiating UE's ID (UE-Vs upper layer ID).

NOTE: Stage 3 can decide if these IDs can be carried in the same IE or separate IEs, for example, the Station ID/Vehicle Temp ID only needs to be 4 octets.

For "V2X Service oriented layer 2 link establishment",
The Announced V2X Service Info needs to include the information about V2X Service requesting L2 link establishment, e.g. PSID or ITS-AIDS of the V2X application. Sensor Sharing, and etc can be the case for the V2X Service.

The IP Address Config, which is specified as mandatory for ProSe, should allow an indication that no IP is to be used, such that the receiving UE (e.g. UE-2) would not start any IP configuration procedure for this particular link.

The IEs dedicated for security need to be reviewed by SA3, as the security mechanism for eV2X may be different and requires different IEs.

Additional configuration information regarding the link, e.g. when RRC message is used there may be AS layer configurations.

6.11.3.3 Link Identifier Update Procedure for Privacy Protection of Unicast Communication

Figure 7:
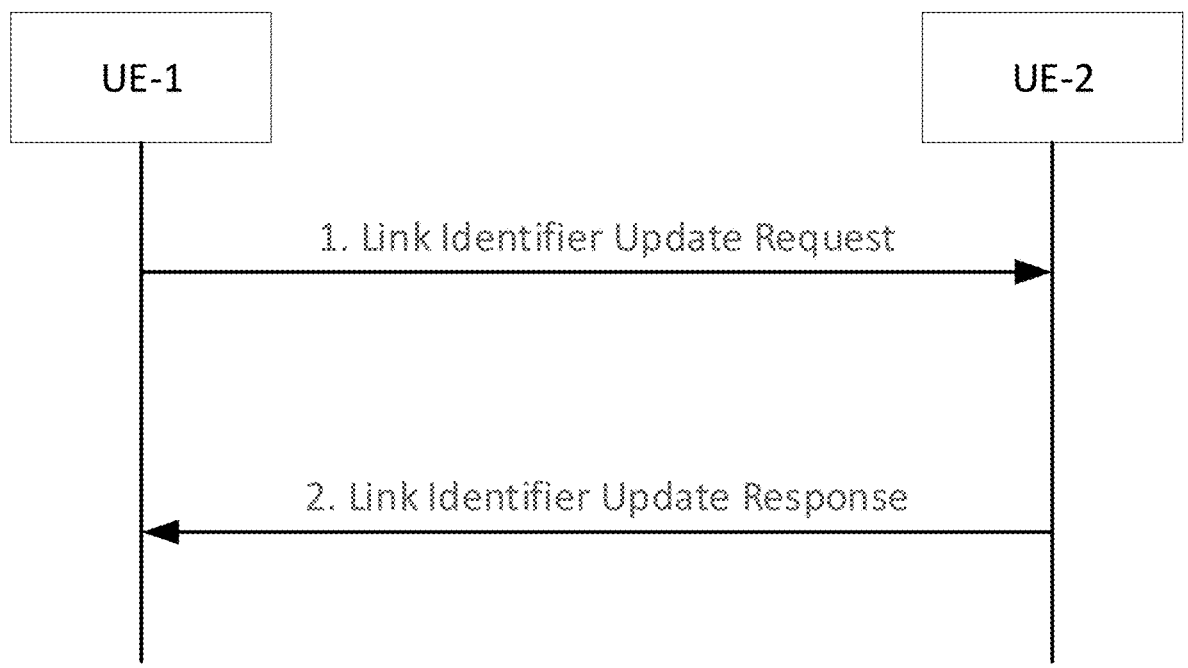
FIG. 7 is a reproduction of Figure 6.11.3.3-1 of 3GPP TR 23.786 V1.0.0.

[Figure 6.11.3.3-1 of 3GPP TR 23.786 V1.0.0, entitled "Layer-2 link identifier update procedure", is reproduced as FIG. 7]

This procedure is used to update the peer in the unicast communication of the impending change of the identifiers used for this link. Due to the privacy requirements, in eV2X use, UE should frequently change its identifiers in order to avoiding being trackable by 3rd party. When the identifier change happens, all identifiers across all the layers, i.e. from application layer ID to L2 ID, need to be changed. This signaling is required before the identifier changes happen, to prevent service interruptions.

1. UE-1 decides the change of identifiers, e.g. due to the upper layer identifier change or a timer, and includes the new identifiers to use (including the new upper layer identifiers, new IP address/prefix if application, new L2 IDs) in the Link Identifier Update Request message, and send to UE-2 before it changes the identifiers. The new identifiers to use should be cyphered to protect privacy.

NOTE 1: The timer is running on a per Source L2 ID.

2. UE-2 respond with a Link Identifier Update Response message. Upon reception of the message, UE-1 and UE-2 can start to use the new identifiers for the data traffic. UE-1 shall receive traffic on its old L2 ID until it receives the Link Id Update Response from UE-2.

NOTE 2: If there are multiple links from UE-1 using the same upper layer identifiers or L2 IDs, UE-1 needs to perform the update procedure over each of the link and for each link needs to keep receiving traffic on its old L2 ID for that specific link until it receives the Link Id Update Response.

6.11.3.4 Security Aspects for Layer 2 Link

As the eV2X applications have associated security certificates, the unicast link can reuse those to derive the security association for protecting the signalling or data of the unicast link.

6.11.4 Impact on Existing Entities and Interfaces

Editor's note: Impacts on existing nodes or functionality will be added.

6.11.5 Topics for Further Study

None.

6.11.6 Conclusions

Solution documented in clauses 6.11.1 to 6.11.4 addressed all the aspects of Key Issue #9 Support of unicast/multicast for sensor sharing over PC5, and should move to normative phase. Following aspects will be further updated based on feedbacks from other Working Groups:

the signalling message definition for unicast link establishment and management, e.g. if and how RRC signalling is used for unicast link;

the choice of per packet QoS model or bearer based QoS model for broadcast, groupcast, and unicast based on RAN decisions;

signal to the base station regarding the service used when network scheduled mode is used;

the potential security related procedure updates for unicast communication over PC5.

NOTE: The application layer may use unicast or groupcast communication mechanism for different applications, e.g. platooning applications.

3GPP TS 36.300 V15.3.0 introduced the mapping between sidelink radio bearers and sidelink logical channels as follows:

Layer 2

Layer 2 is split into the following sublayers: Medium Access Control (MAC), Radio Link Control (RLC) and Packet Data Convergence Protocol (PDCP).

This subclause gives a high level description of the Layer 2 sub-layers in terms of services and functions. The three figures below depict the PDCP/RLC/MAC architecture for downlink, uplink and Sidelink, where:

Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels.

The multiplexing of several logical channels (i.e. radio bearers) on the same transport channel (i.e. transport block) is performed by the MAC sublayer;

In both uplink and downlink, when neither CA nor DC are configured, only one transport block is generated per TTI in the absence of spatial multiplexing;

In Sidelink, only one transport block is generated per TTI.

Figure 8:
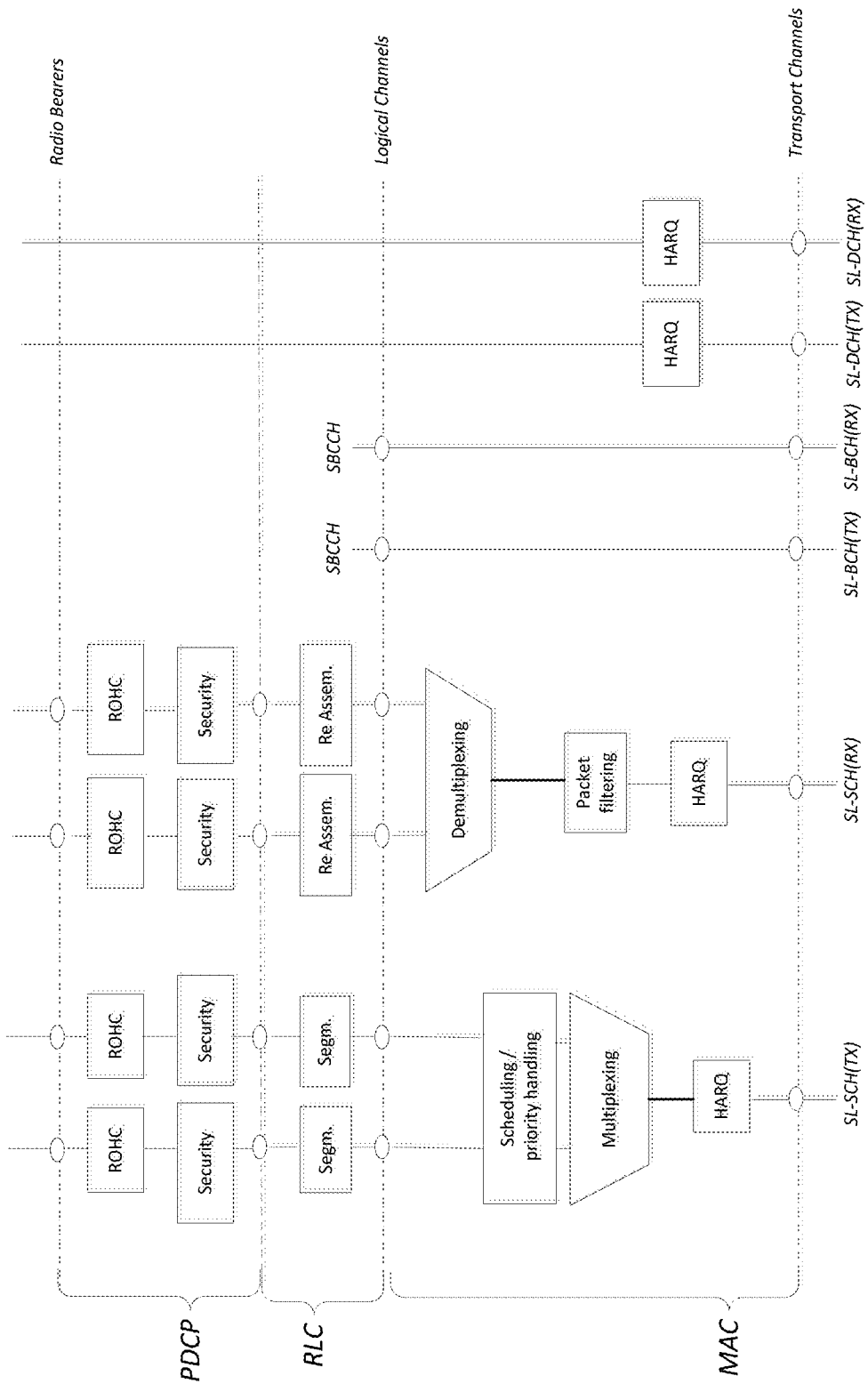
FIG. 8 is a reproduction of Figure 6-3 of 3GPP TS 36.300 V15.3.0.

[Figure 6-3 of 3GPP TS 36.300 V15.3.0, entitled "Layer 2 Structure for Sidelink", is reproduced as FIG. 8]

3GPP TS 23.303 V15.1.0 introduced the following:

5.1.1.5.2 PC5 Signalling Protocol

Legend:

The PDCP/RLC/MAC/PHY functionality is specified in TS 36.300 [17].

PC5 Signalling Protocol" is used for control plane signalling over PC5 (e.g. establishment, maintenance and release of secure layer-2 link over PC5, TMGI monitoring requests, Cell ID announcement requests etc. as described elsewhere in this specification).

The SDU Type field (3 bits) in the PDCP header is used to discriminate between IP, ARP and PC5 Signalling Protocol. ARP is not supported for one-to-one communication.

PC5 Signalling Protocol messages are sent on a unicast Destination Layer-2 ID.

Figure 9:
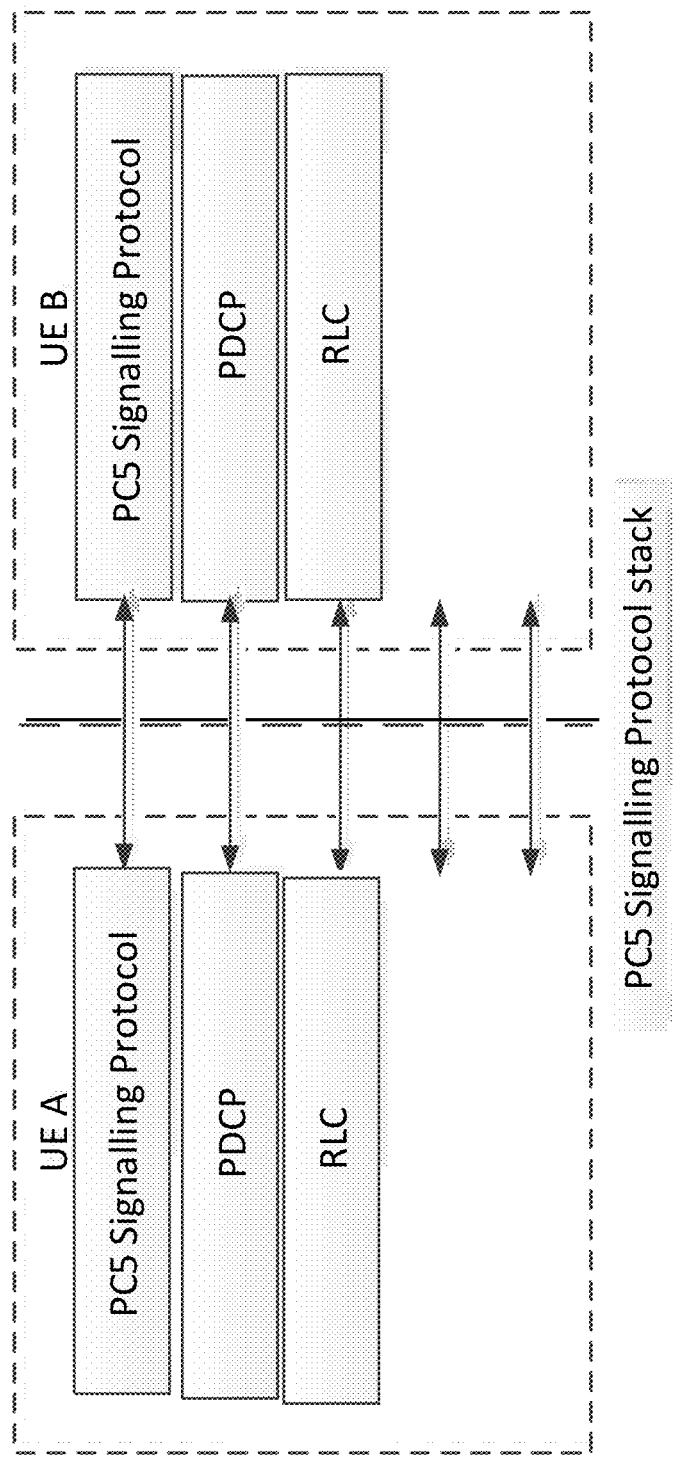
FIG. 9 is a reproduction of Figure 5.1.1.5.3-1 of TS 23.303 V15.1.0.

[Figure 5.1.1.5.3-1 of TS 23.303 V15.1.0, entitled "PC5 Signalling Protocol stack", is reproduced as FIG. 9]

In 3GPP TR 23.786, a procedure used to update L2ID (i.e. Link identifier update procedure for privacy protection of unicast communication) was introduced. This procedure is used to update the peer in the unicast communication of the impending change of the identifiers used for this link. Due to the privacy requirements, in eV2X use, UE should frequently change its identifiers in order to avoiding being trackable by 3rd party. When the identifier change happens, all identifiers across all the layers, i.e. from application layer ID to L2ID, need to be changed. This signalling is required before the identifier changes happen, to prevent service interruptions.

There are two UEs (UE-1 and UE-2) performing unicast communication. UE-1 may perform the procedure used to update its L2ID with UE-2. UE-1 could transmit a link identifier update request message to UE-2. In the link identifier update request message, a new L2ID of UE-1 could be included. In view of UE-2, L2ID of UE-1 is considered as a destination ID of packets transmitted from UE-2 to UE-1. Therefore, upon reception of the link identifier update request message, UE-2 knows that the destination L2ID of UE-1 is changed.

In general, lower layers of a UE should not deliver unexpected sidelink packets (sidelink data frames) to upper layers of the UE. Thus, a sidelink identity (SL ID) of a UE and/or a sidelink identity of a peer UE could be used by the UE to filter out unwanted sidelink packets for unicast in NR V2X. Each sidelink identity could be a lower layer identity. Each lower layer identity could be a Layer-2 identity or a Layer-1 identity. Possibly, each Layer-1 identity could be derived from a Layer-2 identity. Possibly, each sidelink packet (or sidelink data frame) could include user traffic (on STCH), PC5-S signalling (on STCH) or PC5-RRC signalling (on SCCH).

Figure 10:
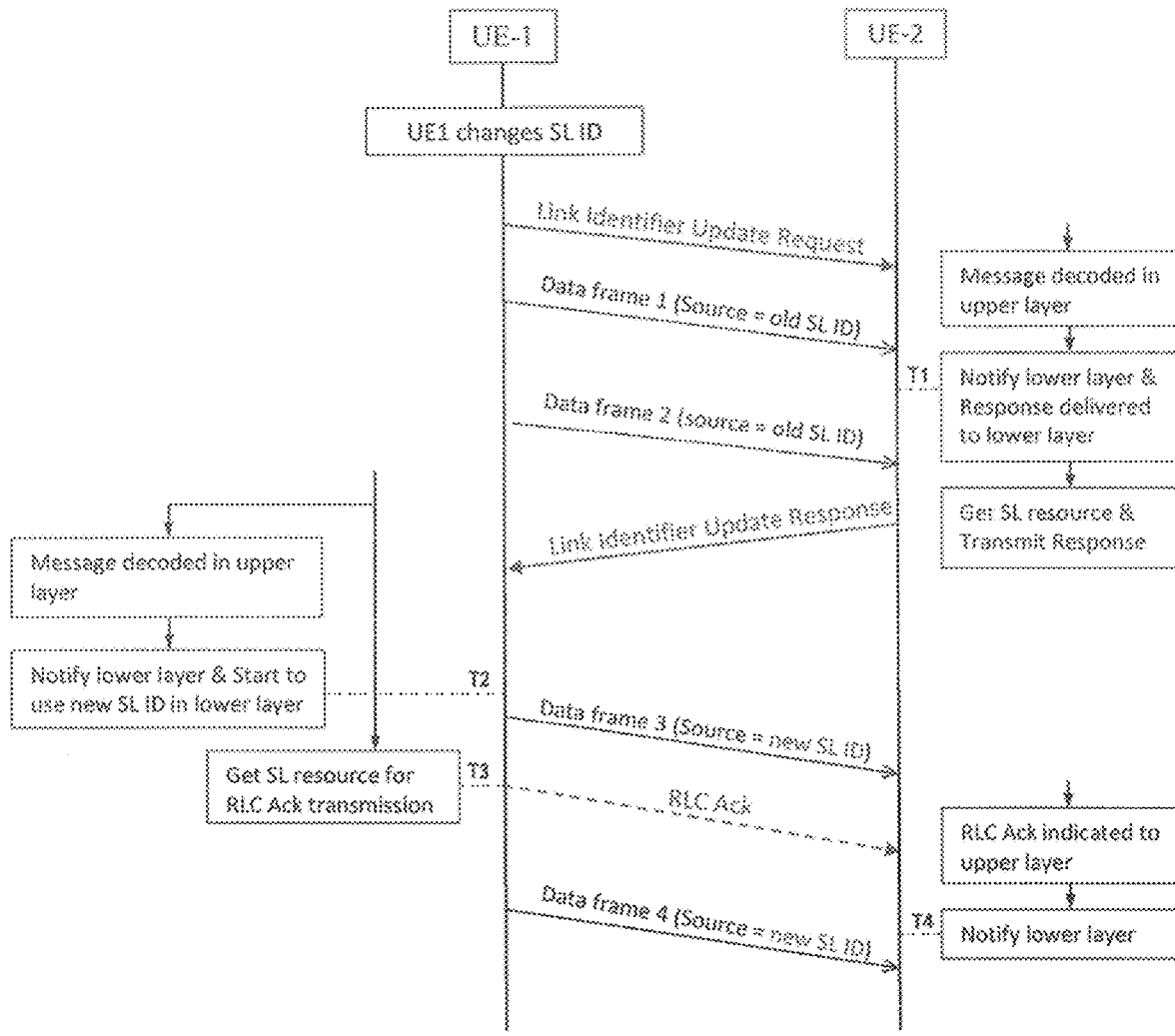
FIG. 10 is a diagram according to one exemplary embodiment.

According to the link identifier update procedure specified in section 6.11.3.3 in TR23.786 [1], upon reception of the Link Identifier Update Response message, UE-1 and UE-2 can start to use the new identifiers for the data traffic, and UE-1 shall receive traffic on its old lower-layer ID until it receives the Link Identifier Update Response message from UE-2. Actually, UE-2 has no information to know the exact timing when UE-1 receives the Link Identifier Update Response message from UE-2. FIG. 10 illustrates an example of extended the link identifier update procedure for unicast sidelink communication with potential lower layer behaviours.

Since the new UE-1 lower-layer ID is delivered by the upper layer in UE-2 to the lower layer(s) after the Link Identifier Update Request message is decoded, the lower layer(s) of UE-2 in general could start to use the new UE-1 lower-layer ID once it is notified by the upper layer (e.g. T1 in FIG. 10). As shown in FIG. 10, UE-1 may continue transmitting data to UE-2 after transmission of the Link Identifier Update Request message. As a result, data frame 2 transmitted with the old UE-1 lower-layer ID would be filtered out and discarded by the lower layer(s) of UE-2. Some way for UE-2 to determine when to start using the new lower-layer identifiers should be specified.

If RLC (Radio Link Control) AM (Acknowledged Mode) is configured to a sidelink logical channel used for transmitting the Link Identifier Update Response message, another potential timing for UE-2 to start using the new UE-1 lower-layer ID is when the lower layer(s) is notified by the upper layer that successful transmission of the Link Identifier Update Response message has been confirmed (i.e. RLC acknowledgement or PDCP acknowledgement is received for this message) (e.g. T4 in FIG. 10). Instead, if RLC UM (Unacknowledged Mode) is configured, the successful transmission of the Link Identifier Update Response message could be confirmed based on a HARQ (Hybrid Automatic Repeat Request) feedback acknowledgement of a HARQ process used for transmission of the Link Identifier Update Response message. It is possible that the upper layer postpones notifying the lower layer(s) of UE-1 lower-layer ID change until successful transmission of the Link Identifier Update Response message has been confirmed. UE-2 may then start to use the new UE-1 lower-layer ID when the lower layer(s) is notified of UE-1 lower-layer ID change.

Figure 11:
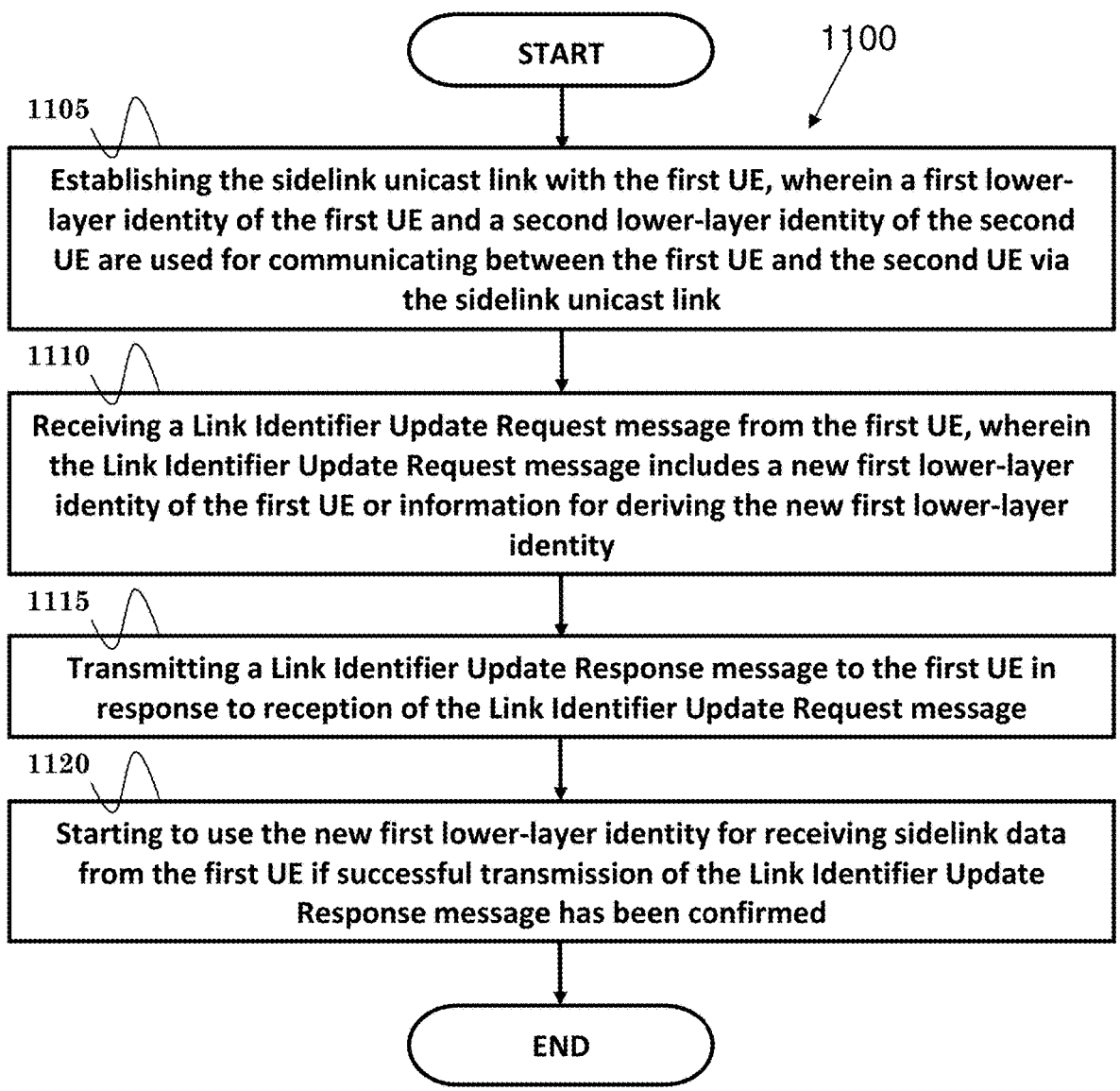
FIG. 11 is a flow chart according to one exemplary embodiment.

FIG. 11 is a flow chart 1100 according to one exemplary embodiment from the perspective of a second UE for changing sidelink identity associated with a first UE for a sidelink unicast link. In step 1105, the second UE establishes the sidelink unicast link with the first UE, wherein a first lower-layer identity of the first UE and a second lower-layer identity of the second UE are used for communicating between the first UE and the second UE via the sidelink unicast link. In step 1110, the second UE receives a Link Identifier Update Request message from the first UE, wherein the Link Identifier Update Request message includes a new first lower-layer identity of the first UE or information for deriving the new first lower-layer identity. In step 1115, the second UE transmits a Link Identifier Update Response message to the first UE in response to reception of the Link Identifier Update Request message. In step 1120, the second UE starts to use the new first lower-layer identity for receiving sidelink data from the first UE if successful transmission of the Link Identifier Update Response message has been confirmed.

In one embodiment, the (new) first lower-layer identity could be a (new) Layer-2 identity of the first UE. The second lower-layer identity could be a Layer-2 identity of the second UE.

In one embodiment, the second UE could use the second lower-layer identity as a source and the new first lower-layer identity as a destination in a sidelink data frame for transmitting the sidelink data frame after successful transmission of the Link Identifier Update Response message has been confirmed. The source could be the Layer-2 identity of the second UE, and the destination could be the (new) Layer-2 identity of the first UE. Alternatively, the source could be a Layer-1 identity of the second UE derived from the Layer-2 identity of the second UE, and the destination could be a Layer-1 identity of the first UE derived from the (new) Layer-2 identity of the first UE.

In one embodiment, the second UE could use the new first lower-layer identity as a source and the second lower-layer identity as a destination for filtering received sidelink data frames after successful transmission of the Link Identifier Update Response message has been confirmed. The source could be the (new) Layer-2 identity of the first UE, and the destination could be the Layer-2 identity of the second UE. Alternatively, the source could be a Layer-1 identity of the first UE derived from the (new) Layer-2 identity of the first UE, and the destination could be a Layer-1 identity of the second UE derived from the Layer-2 identity of the second UE.

In one embodiment, the transmission of the Link Identifier Update Response message could be confirmed based on associated RLC acknowledgement or PDCP acknowledgement. The Link Identifier Update Response message could be transmitted on a sidelink logical channel associated with an AM RLC entity.

In one embodiment, the transmission of the Link Identifier Update Response message could be confirmed based on associated HARQ feedback acknowledgement. The Link Identifier Update Response message could be transmitted on a sidelink logical channel associated with an UM RLC entity.

Referring back to FIGS. 3 and 4, in one exemplary embodiment of a second UE, the device 300 includes a program code 312 stored in the memory 310. The CPU 308 could execute program code 312 to enable the second UE (i) to establish the sidelink unicast link with the first UE, wherein a first lower-layer identity of the first UE and a second lower-layer identity of the second UE are used for communicating between the first UE and the second UE via the sidelink unicast link, (ii) to receive a Link Identifier Update Request message from the first UE, wherein the Link Identifier Update Request message includes a new first lower-layer identity of the first UE or information for deriving the new first lower-layer identity, (iii) to transmit a Link Identifier Update Response message to the first UE in response to reception of the Link Identifier Update Request message, and (iv) to start to use the new first lower-layer identity for receiving sidelink data from the first UE if successful transmission of the Link Identifier Update Response message has been confirmed. Furthermore, the CPU 308 can execute the program code 312 to perform all of the above-described actions and steps or others described herein.

In the above solution, however, there still may be certain data frames (e.g. data frame 3) being filtered out as shown in FIG. 10. Therefore, another solution could be that after being notified of UE-1 lower-layer ID change by the upper layer(s) (in T1 of FIG. 10), UE-2 continues to use the old UE-1 lower-layer ID for receiving data frames from UE-1 until a data frame with the new UE-1 lower-layer ID is received.

Figure 12:
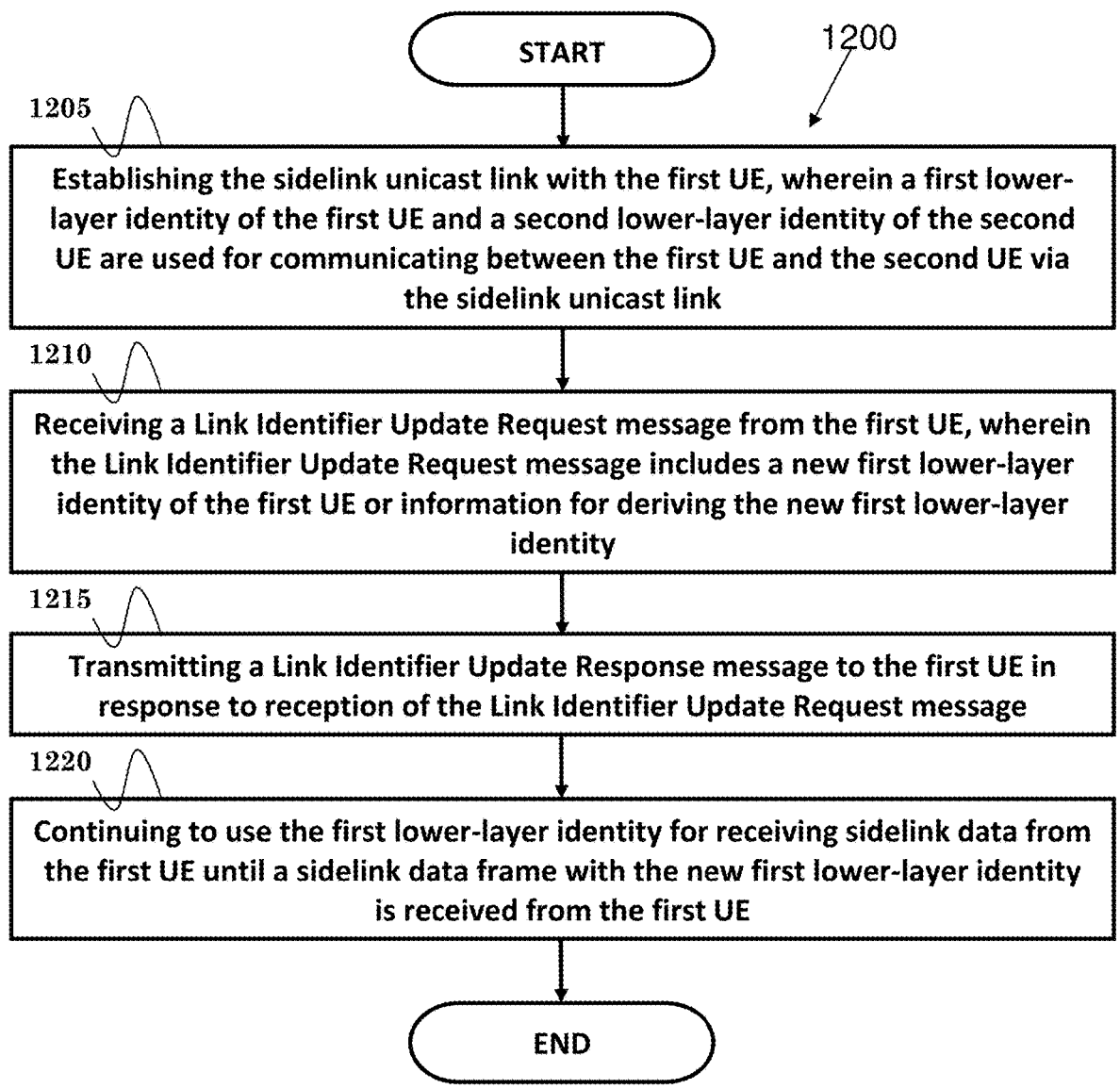
FIG. 12 is a flow chart according to one exemplary embodiment.

FIG. 12 is a flow chart 1200 according to one exemplary embodiment from the perspective of a second UE for changing sidelink identity associated with a first UE for a sidelink unicast link. In step 1205, the second UE establishes the sidelink unicast link with the first UE, wherein a first lower-layer identity of the first UE and a second lower-layer identity of the second UE are used for communicating between the first UE and the second UE via the sidelink unicast link. In step 1210, the second UE receives a Link Identifier Update Request message from the first UE, wherein the Link Identifier Update Request message includes a new first lower-layer identity of the first UE or information for deriving the new first lower-layer identity. In step 1215, the second UE transmits a Link Identifier Update Response message to the first UE in response to reception of the Link Identifier Update Request message. In step 1220, the second UE continues to use the first lower-layer identity for receiving sidelink data from the first UE until a sidelink data frame with the new first lower-layer identity is received from the first UE.

In one embodiment, the second UE could use the first lower-layer identity as a source and the new first lower-layer identity as a source for filtering received sidelink data frames before a very first sidelink data frame with the new first lower-layer identity is received from the first UE or successful transmission of the Link Identifier Update Response message has been confirmed. The second UE could also use the new first lower-layer identity as a source for filtering received sidelink data frames after a very first sidelink data frame with the new first lower-layer identity is received from the first UE or successful transmission of the Link Identifier Update Response message has been confirmed. A lower-layer identity of the first lower-layer identity, the new first lower-layer identity, and/or the second lower-layer identity could be a Layer-2 identity or a Layer-1 identity.

In one embodiment, the second UE could use the new first lower-layer identity for communicating with the first UE afterwards. The (new) first lower-layer identity could be a (new) Layer-2 identity of the first UE, and the second lower-layer identity could be a Layer-2 identity of the second UE.

In one embodiment, the second UE could use the second lower-layer identity as a source and the new first lower-layer identity as a destination in a sidelink data frame for transmitting the sidelink data frame to the first UE after a sidelink data frame with the new first lower-layer identity is received from the first UE or after successful transmission of the Link Identifier Update Response message has been confirmed. The source could be the Layer-2 identity of the second UE, and the destination could be the (new) Layer-2 identity of the first UE. Alternatively, the source could be a Layer-1 identity of the second UE derived from the Layer-2 identity of the second UE, and the destination could be a Layer-1 identity of the first UE derived from the (new) Layer-2 identity of the first UE.

In one embodiment, the second UE could use the new first lower-layer identity as a source and the second lower-layer identity as a destination for filtering received sidelink data frames after a sidelink data frame with the new first lower-layer identity is received from the first UE. The source could be the (new) Layer-2 identity of the first UE, and the destination could be the Layer-2 identity of the second UE. Alternatively, the source could be a Layer-1 identity of the first UE derived from the (new) Layer-2 identity of the first UE, and the destination could be a Layer-1 identity of the second UE derived from the Layer-2 identity of the second UE.

In one embodiment, the transmission of the Link Identifier Update Response message could be confirmed based on associated RLC acknowledgement or PDCP acknowledgement. The Link Identifier Update Response message could be transmitted on a sidelink logical channel associated with an AM RLC entity.

Alternatively, the transmission of the Link Identifier Update Response message could be confirmed based on associated HARQ feedback acknowledgement. The Link Identifier Update Response message could be transmitted on a sidelink logical channel associated with an UM RLC entity.

Referring back to FIGS. 3 and 4, in one exemplary embodiment of a second UE, the device 300 includes a program code 312 stored in the memory 310. The CPU 308 could execute program code 312 to enable the second UE (i) to establish the sidelink unicast link with the first UE, wherein a first lower-layer identity of the first UE and a second lower-layer identity of the second UE are used for communicating between the first UE and the second UE via the sidelink unicast link, (ii) to receive a Link Identifier Update Request message from the first UE, wherein the Link Identifier Update Request message includes a new first lower-layer identity of the first UE or information for deriving the new first lower-layer identity, (iii) to transmit a Link Identifier Update Response message to the first UE in response to reception of the Link Identifier Update Request message, and (iv) to continue to use the first lower-layer identity for receiving sidelink data from the first UE until a sidelink data frame with the new first lower-layer identity is received from the first UE. Furthermore, the CPU 308 can execute the program code 312 to perform all of the above-described actions and steps or others described herein.

Considering that a data frame with the old UE-1 lower-layer ID may be still received after a (very first) data frame with the new UE-1 lower-layer ID is received (e.g. due to data priority or retransmission), another alternative is for UE-2 to use both the old UE-1 lower-layer ID and the new UE-1 lower-layer ID for data frame filtering during a time period starting from the time when the lower layer is notified of UE-1 L2 ID change (in T1 of FIG. 10). UE-2 will accept a data frame with either the old UE-1 lower-layer ID or the new UE-1 lower-layer ID during this time period. The time period could be controlled by a timer. The time period may be set to a default value (i.e. pre-configured in UE), may be determined by UE-2 autonomously (i.e. up to UE implementation), may be configured by UE-1 (via e.g. the Link Identifier Update Request message), may be configured by a network node (e.g. base station, core network, V2X control function, etc.), or may be provided in system information (broadcasted by a network node e.g. base station). Alternatively, the time period may be indicated by upper layer (e.g. V2X layer, NAS layer or Application layer). The upper layer could indicate start of the time period. The upper layer could indicate end of the time period. After this time period, UE-2 accepts data frame(s) with (only) the new UE-1 lower-layer ID. In other words, UE-2 accepts data frame(s) with (only) the new UE-1 lower-layer ID starting from end of the time period.

Figure 13:
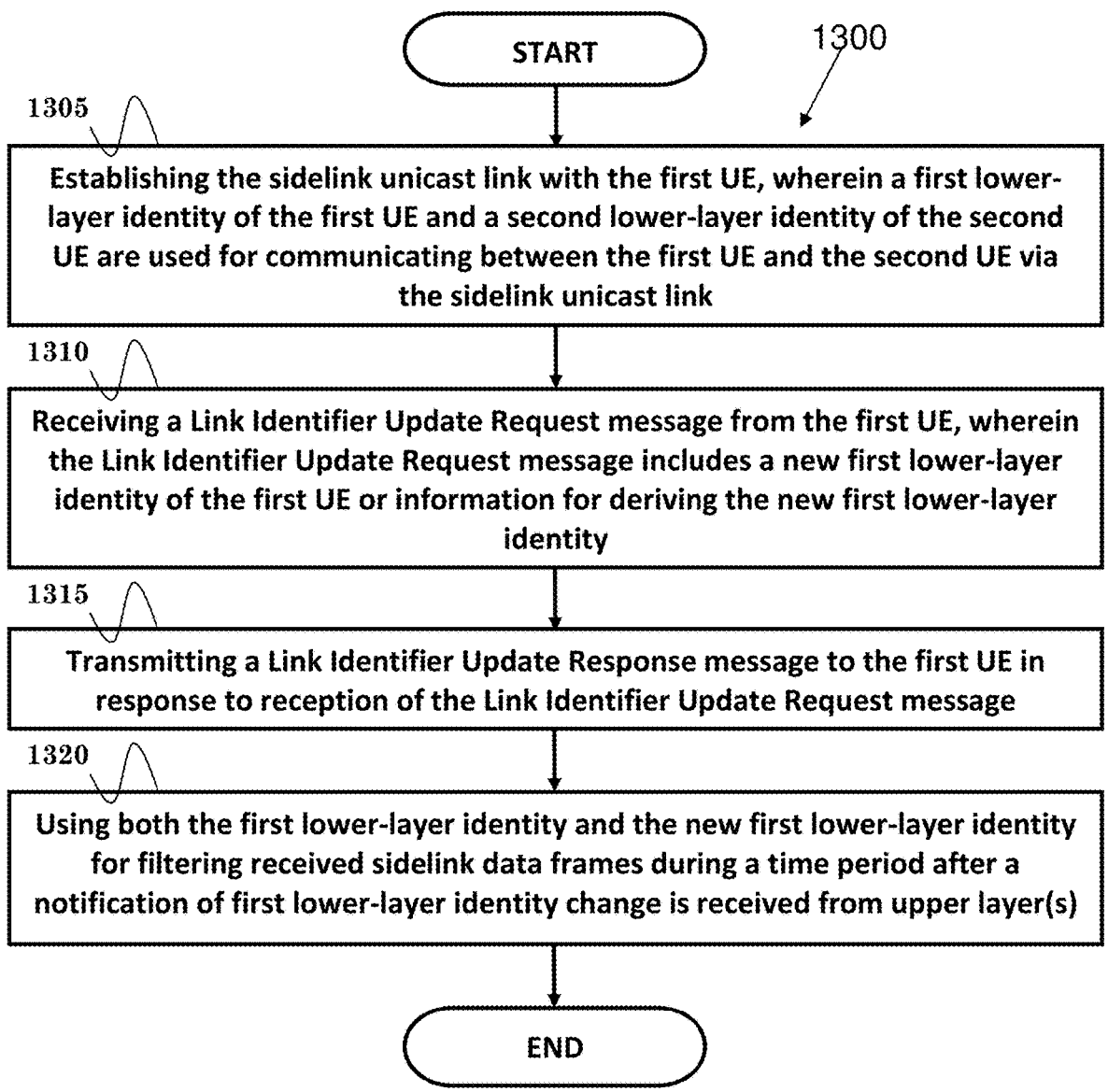
FIG. 13 is a flow chart according to one exemplary embodiment.

FIG. 13 is a flow chart 1300 according to one exemplary embodiment from the perspective of a second UE for changing sidelink identity associated with a first UE for a sidelink unicast link. In step 1305, the second UE establishes the sidelink unicast link with the first UE, wherein a first lower-layer identity of the first UE and a second lower-layer identity of the second UE are used for communicating between the first UE and the second UE via the sidelink unicast link. In step 1310, the second UE receives a Link Identifier Update Request message from the first UE, wherein the Link Identifier Update Request message includes a new first lower-layer identity of the first UE or information for deriving the new first lower-layer identity. In step 1315, the second UE transmits a Link Identifier Update Response message to the first UE in response to reception of the Link Identifier Update Request message. In step 1320, the second UE uses both the first lower-layer identity and the new first lower-layer identity for filtering received sidelink data frames during a time period after a notification of first lower-layer identity change is received from upper layer(s).

In one embodiment, the second UE could use the new first lower-layer identity for filtering received sidelink data frames after the time period. The (new) first lower-layer identity could be a (new) Layer-2 identity of the first UE. The second lower-layer identity could be a Layer-2 identity of the second UE.

In one embodiment, the second UE could use the first lower-layer identity as a source and the second lower-layer identity as a destination for filtering received sidelink data frames during the time period. The second UE could also use the new first lower-layer identity as a source and the second lower-layer identity as a destination for filtering received sidelink data frames during the time period. In addition, the second UE could use the new first lower-layer identity as a source and the second lower-layer identity as a destination for filtering received sidelink data frames after the time period. The source could be the (new) Layer-2 identity of the first UE, and the destination could be the Layer-2 identity of the second UE. Alternatively, the source could be a Layer-1 identity of the first UE derived from the (new) Layer-2 identity of the first UE, and the destination could be a Layer-1 identity of the second UE derived from the Layer-2 identity of the second UE.

In one embodiment, the second UE could use the second lower-layer identity as a source and the new first lower-layer identity as a destination in a sidelink data frame for transmitting the sidelink data frame to the first UE after the notification of first lower-layer identity change is received from upper layer(s). The second UE could also use the second lower-layer identity as a source and the new first lower-layer identity as a destination in a sidelink data frame for transmitting the sidelink data frame to the first UE after successful transmission of the Link Identifier Update Response message has been confirmed. The source could be the Layer-2 identity of the second UE, and the destination could be the (new) Layer-2 identity of the first UE. Alternatively, the source could be a Layer-1 identity of the second UE derived from the Layer-2 identity of the second UE, and the destination could be a Layer-1 identity of the first UE derived from the (new) Layer-2 identity of the first UE.

In one embodiment, the transmission of the Link Identifier Update Response message could be confirmed based on associated RLC acknowledgement or PDCP acknowledgement. The Link Identifier Update Response message could be transmitted on a sidelink logical channel associated with an AM RLC entity. The transmission of the Link Identifier Update Response message is confirmed based on associated HARQ feedback acknowledgement. The Link Identifier Update Response message could be transmitted on a sidelink logical channel associated with an UM RLC entity.

Referring back to FIGS. 3 and 4, in one exemplary embodiment of a first UE, the device 300 includes a program code 312 stored in the memory 310. The CPU 308 could execute program code 312 to enable the first UE (i) to establish the sidelink unicast link with the first UE, wherein a first lower-layer identity of the first UE and a second lower-layer identity of the second UE are used for communicating between the first UE and the second UE via the sidelink unicast link, (ii) to receive a Link Identifier Update Request message from the first UE, wherein the Link Identifier Update Request message includes a new first lower-layer identity of the first UE or information for deriving the new first lower-layer identity, (iii) to transmit a Link Identifier Update Response message to the first UE in response to reception of the Link Identifier Update Request message, and (iv) to use both the first lower-layer identity and the new first lower-layer identity for filtering received sidelink data frames during a time period after a notification of first lower-layer identity change is received from upper layer(s). Furthermore, the CPU 308 can execute the program code 312 to perform all of the above-described actions and steps or others described herein.

Figure 14:
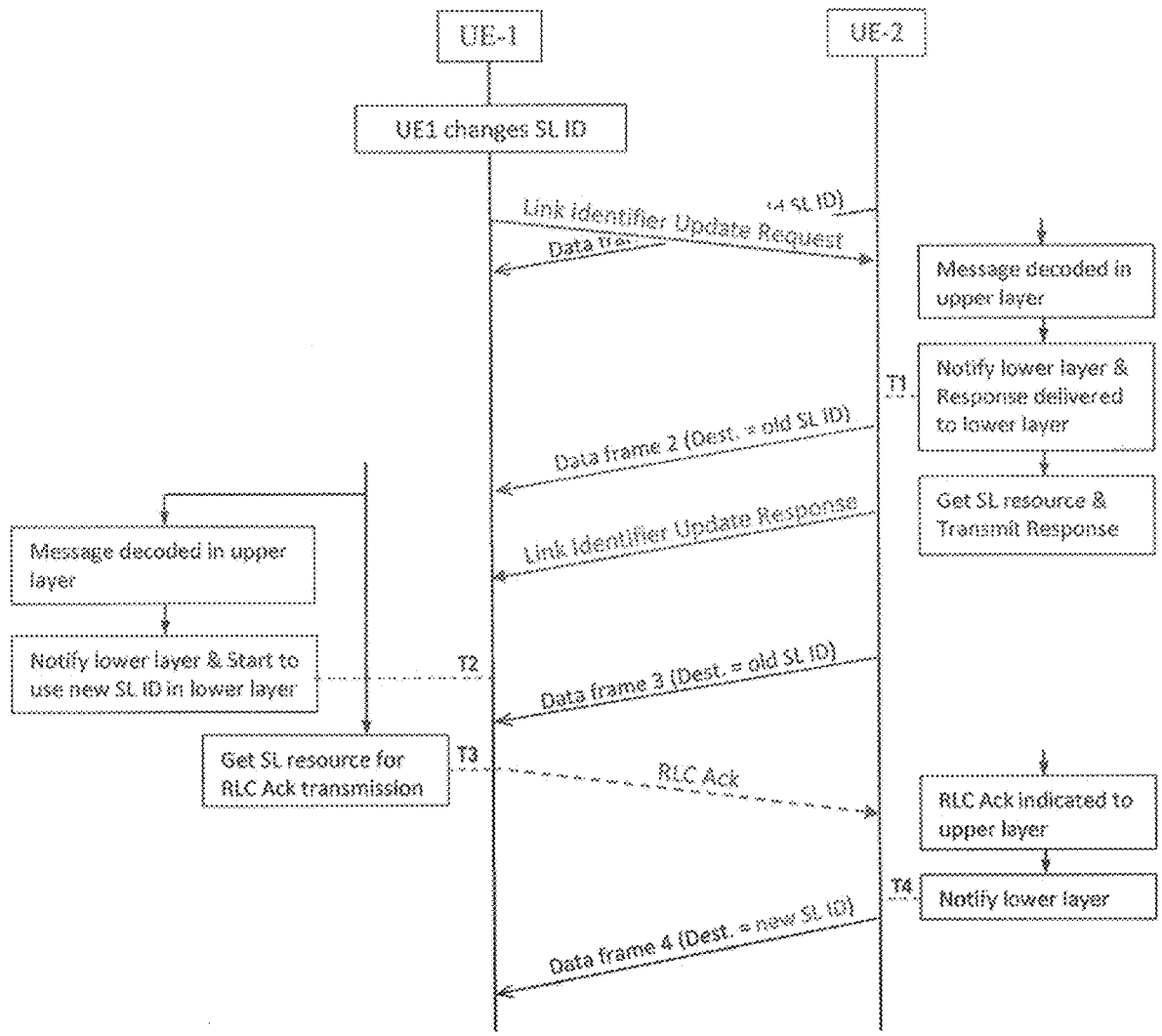
FIG. 14 is a diagram according to one exemplary embodiment.

In FIG. 14, another example of extended link identifier update procedure for unicast communication with potential lower layer behaviours is illustrated. According to 3GPP TR 23.786, UE-1 shall receive traffic on its old lower-layer ID until it receives the Link Identifier Update Response message from UE-2 (i.e. T2 in FIG. 14). If UE-2 starts to use the new UE-1 lower-layer identity for transmitting a sidelink data frame to the first UE after successful transmission of the Link Identifier Update Response message has been confirmed, data frame 3 from UE-2 would be filtered out and thus be discarded as shown in FIG. 14. Some way to avoid discarding valid data frames in UE-1 should be considered.

After receiving the Link Identifier Update Response message, UE-1 could continue to use the old UE-1 lower-layer ID (and the new UE-1 lower-layer ID) for receiving data frames from UE-2 until a data frame with the new UE-1 lower-layer ID is received from UE-2.

Figure 15:
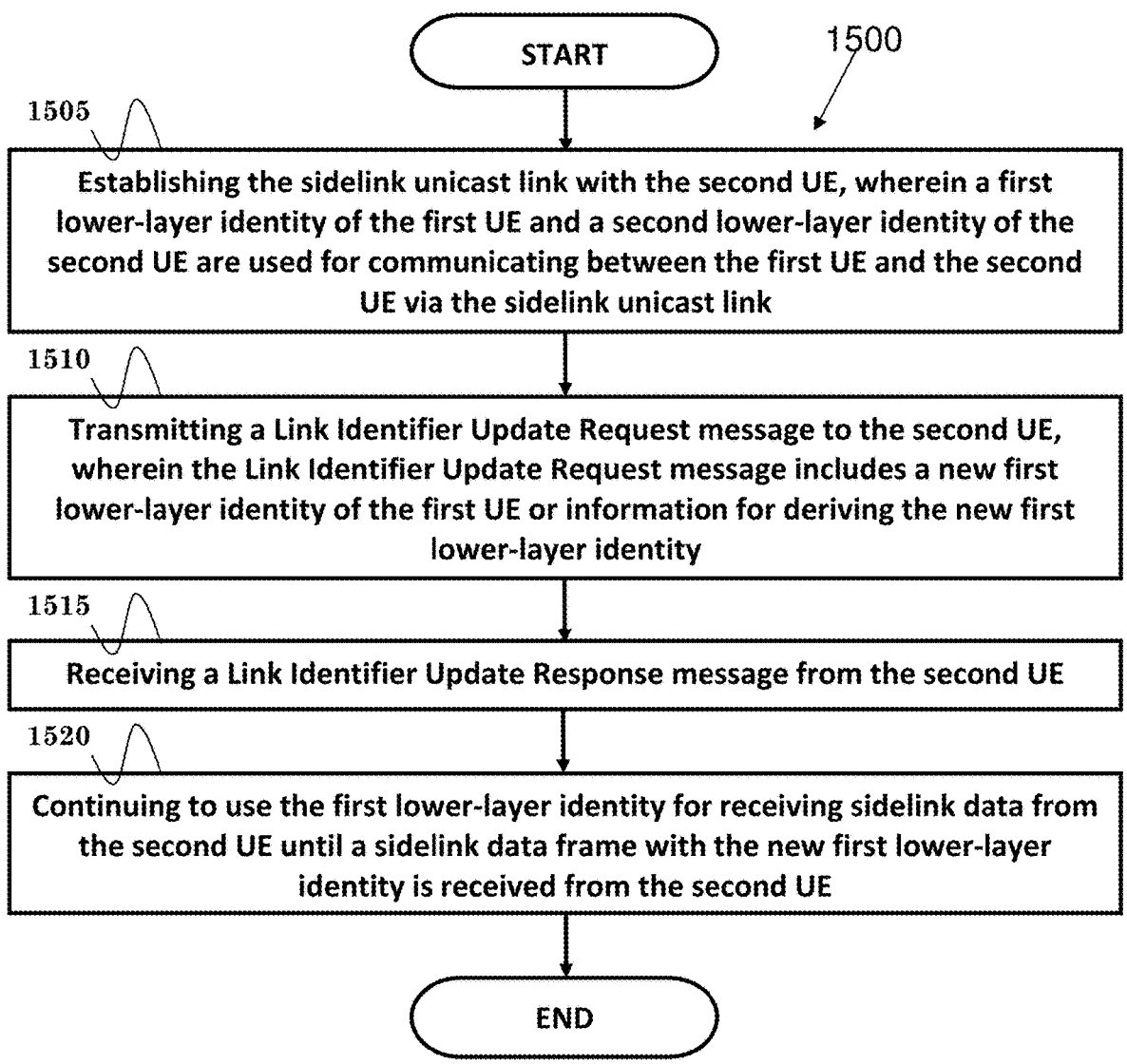
FIG. 15 is a flow chart according to one exemplary embodiment.

FIG. 15 is a flow chart 1500 according to one exemplary embodiment from the perspective of a first UE for changing sidelink identity for a sidelink unicast link associated with a second UE. In step 1505, the first UE establishes the sidelink unicast link with the second UE, wherein a first lower-layer identity of the first UE and a second lower-layer identity of the second UE are used for communicating between the first UE and the second UE via the sidelink unicast link. In step 1510, the first UE transmits a Link Identifier Update Request message to the second UE, wherein the Link Identifier Update Request message includes a new first lower-layer identity of the first UE or information for deriving the new first lower-layer identity. In step 1515, the first UE receives a Link Identifier Update Response message from the second UE. In step 1520, the first UE continues to use the first lower-layer identity for receiving sidelink data from the second UE until a sidelink data frame with the new first lower-layer identity is received from the second UE.

In one embodiment, the first UE could use the first lower-layer identity as a destination and the new first lower-layer identity as a destination for filtering received sidelink data frames before a very first sidelink data frame with the new first lower-layer identity is received from the second UE. In one embodiment, the first UE could use the new first lower-layer identity as a destination for filtering received sidelink data frames after a very first sidelink data frame with the new first lower-layer identity is received from the second UE. A lower-layer identity of the first lower-layer identity, the new first lower-layer identity, and/or the second lower-layer identity could be a Layer-2 identity or a Layer-1 identity.

In one embodiment, the first UE could use the new first lower-layer identity for communicating with the second UE afterwards. The (new) first lower-layer identity could be a (new) Layer-2 identity of the first UE. The second lower-layer identity could be a Layer-2 identity of the second UE.

In one embodiment, the first UE could use the second lower-layer identity as a source and the first lower-layer identity as a destination for filtering received sidelink data frames before a very first sidelink data frame with the new first lower-layer identity is received from the second UE. The first UE could also use the second lower-layer identity as a source and the new first lower-layer identity as a destination for receiving a very first sidelink data frame with the new first lower-layer identity from the second UE. Furthermore, the first UE could use the second lower-layer identity as a source and the new first lower-layer identity as a destination for filtering received sidelink data frames after a sidelink data frame with the new first lower-layer identity is received from the second UE.

In one embodiment, the source could be the Layer-2 identity of the second UE, and the destination could be the (new) Layer-2 identity of the first UE. Alternatively, the source could be a Layer-1 identity of the second UE derived from the Layer-2 identity of the second UE, and the destination could be a Layer-1 identity of the first UE derived from the (new) Layer-2 identity of the first UE.

Referring back to FIGS. 3 and 4, in one exemplary embodiment of a first UE, the device 300 includes a program code 312 stored in the memory 310. The CPU 308 could execute program code 312 to enable the first UE (i) to establish the sidelink unicast link with the second UE, wherein a first lower-layer identity of the first UE and a second lower-layer identity of the second UE are used for communicating between the first UE and the second UE via the sidelink unicast link, (ii) to transmit a Link Identifier Update Request message to the second UE, wherein the Link Identifier Update Request message includes a new first lower-layer identity of the first UE or information for deriving the new first lower-layer identity, (iii) to receive a Link Identifier Update Response message from the second UE, and (iv) to continue to use the first lower-layer identity for receiving sidelink data from the second UE until a sidelink data frame with the new first lower-layer identity is received from the second UE. Furthermore, the CPU 308 can execute the program code 312 to perform all of the above-described actions and steps or others described herein.

Considering that a data frame with the old UE-1 lower-layer ID may be still received after a (very first) data frame with the new UE-1 lower-layer ID is received (e.g. due to data priority or retransmission), another alternative is for UE-1 to use both the old UE-1 lower-layer ID and the new UE-1 lower-layer ID for data frame filtering during a time period starting the time when UE-1 receives the Link Identifier Update Response message (or transmits the Link Identifier Update Request message). UE-1 will accept a data frame with either the old UE-1 lower-layer ID or the new UE-1 lower-layer ID during this time period. The time period could be controlled by a timer. The time period may be set to a default value (i.e. pre-configured in UE), may be determined by UE-2 autonomously (i.e. up to UE implementation), may be configured by a network node (e.g. base station, core network, V2X control function, etc.), or may be provided in system information (broadcasted by a network node e.g. base station). Alternatively, the time period may be indicated by upper layer (e.g. V2X layer, NAS layer or Application layer). The upper layer could indicate start of the time period. The upper layer could indicate end of time period. After this time period, UE-1 accepts data frame(s) with (only) the new UE-1 lower-layer ID. In other words, UE-1 accepts data frame(s) with (only) the new UE-1 lower-layer ID starting from end of the time period.

Figure 16:
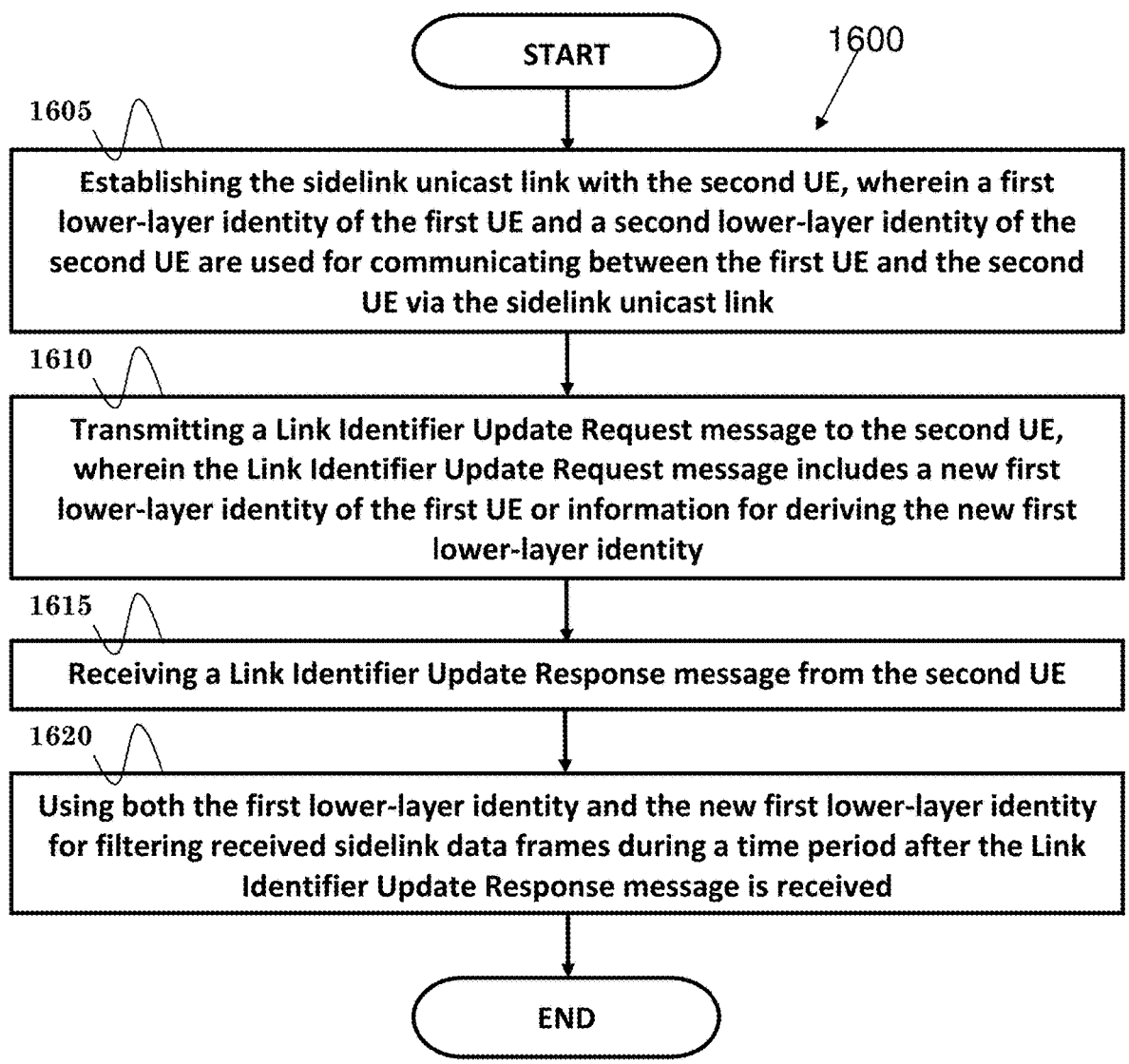
FIG. 16 is a flow chart according to one exemplary embodiment.

FIG. 16 is a flow chart 1600 according to one exemplary embodiment from the perspective of a first UE for changing sidelink identity for a sidelink unicast link associated with a second UE. In step 1605, the first UE establishes the sidelink unicast link with the second UE, wherein a first lower-layer identity of the first UE and a second lower-layer identity of the second UE are used for communicating between the first UE and the second UE via the sidelink unicast link. In step 1610, the first UE transmits a Link Identifier Update Request message to the second UE, wherein the Link Identifier Update Request message includes a new first lower-layer identity of the first UE or information for deriving the new first lower-layer identity. In step 1615, the first UE receives a Link Identifier Update Response message from the second UE. In step 1620, the first UE uses both the first lower-layer identity and the new first lower-layer identity for filtering received sidelink data frames during a time period after the Link Identifier Update Response message is received.

In one embodiment, the first UE could use the new first lower-layer identity for filtering received sidelink data frames after the time period. The (new) first lower-layer identity could be a (new) Layer-2 identity of the first UE, and the second lower-layer identity could be a Layer-2 identity of the second UE.

In one embodiment, the first UE could use the second lower-layer identity as a source and the first lower-layer identity as a destination for filtering received sidelink data frames during the time period. The first UE could also use the second lower-layer identity as a source and the new first lower-layer identity as a destination for filtering received sidelink data frames during the time period. Furthermore, the first UE could use the second lower-layer identity as a source and the new first lower-layer identity as a destination for filtering received sidelink data frames after the time period.

In one embodiment, the source could be the Layer-2 identity of the second UE, and the destination could be the (new) Layer-2 identity of the first UE. Alternatively, the source could be a Layer-1 identity of the second UE derived from the Layer-2 identity of the second UE, and the destination could be a Layer-1 identity of the first UE derived from the (new) Layer-2 identity of the first UE.

In one embodiment, the first UE could use the new first lower-layer identity as a source and the second lower-layer identity as a destination in a sidelink data frame for transmitting the sidelink data frame to the second UE after the Link Identifier Update Response message is received. The source could be the (new) Layer-2 identity of the first UE, and the destination could be the Layer-2 identity of the second UE. Alternatively, the source could be a Layer-1 identity of the first UE derived from the (new) Layer-2 identity of the first UE, and the destination could be a Layer-1 identity of the second UE derived from the Layer-2 identity of the second UE.

Referring back to FIGS. 3 and 4, in one exemplary embodiment of a first UE, the device 300 includes a program code 312 stored in the memory 310. The CPU 308 could execute program code 312 to enable the first UE (i) to establish the sidelink unicast link with the second UE, wherein a first lower-layer identity of the first UE and a second lower-layer identity of the second UE are used for communicating between the first UE and the second UE via the sidelink unicast link, (ii) to transmit a Link Identifier Update Request message to the second UE, wherein the Link Identifier Update Request message includes a new first lower-layer identity of the first UE or information for deriving the new first lower-layer identity, (iii) to receive a Link Identifier Update Response message from the second UE, and (iv) to use both the first lower-layer identity and the new first lower-layer identity for filtering received sidelink data frames during a time period after the Link Identifier Update Response message is received. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a second UE (User Equipment) to change sidelink identity associated with a first UE for a sidelink unicast link, comprising:
    establishing the sidelink unicast link with the first UE, wherein a first lower-layer identity of the first UE and a second lower-layer identity of the second UE are used for communicating between the first UE and the second UE via the sidelink unicast link;
    receiving a Link Identifier Update Request message from the first UE, wherein the Link Identifier Update Request message includes a new first lower-layer identity of the first UE and the Link Identifier Update Request message is transmitted using the first lower-layer identity as a source;
    transmitting a Link Identifier Update Response message to the first UE in response to reception of the Link Identifier Update Request message, wherein the Link Identifier Update Response message is transmitted using the first lower-layer identity as a destination; and
    continuing, after the Link Identifier Update Response message is transmitted, to use the first lower-layer identity for examining the source of each sidelink data frame received from the first UE until a sidelink data frame with the source set to the new first lower-layer identity is received from the first UE, wherein only the new first lower-layer identity is used for receiving following one or more sidelink data frames after the sidelink data frame is received.

2. The method of claim 1, further comprising:
    using the first lower-layer identity as a source and the new first lower-layer identity as a source for filtering received sidelink data frames before a very first sidelink data frame with the new first lower-layer identity is received from the first UE or successful transmission of the Link Identifier Update Response message has been confirmed.

3. The method of claim 1, further comprising:
    using the new first lower-layer identity as a source for filtering received sidelink data frames after a very first sidelink data frame with the new first lower-layer identity is received from the first UE or successful transmission of the Link Identifier Update Response message has been confirmed.

4. The method of claim 1, wherein a lower-layer identity of the first lower-layer identity, the new first lower-layer identity, and/or the second lower-layer identity is a Layer-2 identity or a Layer-1 identity.

5. A method for a first UE (User Equipment) to change sidelink identity for a sidelink unicast link associated with a second UE, comprising:
    establishing the sidelink unicast link with the second UE, wherein a first lower-layer identity of the first UE and a second lower-layer identity of the second UE are used for communicating between the first UE and the second UE via the sidelink unicast link;
    transmitting a Link Identifier Update Request message to the second UE, wherein the Link Identifier Update Request message includes a new first lower-layer identity of the first UE and the Link Identifier Update Request message is transmitted using the first lower-layer identity as a source;
    receiving a Link Identifier Update Response message from the second UE, wherein the Link Identifier Update Response message is transmitted using the first lower-layer identity as a destination; and
    continuing, after the Link Identifier Update Response message is received, to use the first lower-layer identity for examining the destination of each sidelink data frame received from the second U E until a sidelink data frame with the destination set to the new first lower-layer identity is received from the second UE, wherein only the new first lower-layer identity is used for receiving following one or more sidelink data frames after the sidelink data frame is received.

6. The method of claim 5, further comprising:
    using the first lower-layer identity as a destination and the new first lower-layer identity as a destination for filtering received sidelink data frames before a very first sidelink data frame with the new first lower-layer identity is received from the second UE.

7. The method of claim 5, further comprising:
    using the new first lower-layer identity as a destination for filtering received sidelink data frames after a very first sidelink data frame with the new first lower-layer identity is received from the second UE.

8. The method of claim 5, wherein a lower-layer identity of the first lower-layer identity, the new first lower-layer identity, and/or the second lower-layer identity is a Layer-2 identity or a Layer-1 identity.

9. A second UE (User Equipment), comprising:
    a processor; and
    a memory operatively coupled to the processor, wherein the processor is configured to execute a program code stored in the memory to:
        establish the sidelink unicast link with the first UE, wherein a first lower-layer identity of the first UE and a second lower-layer identity of the second UE are used for communicating between the first UE and the second UE via the sidelink unicast link;
        receive a Link Identifier Update Request message from the first UE, wherein the Link Identifier Update Request message includes a new first lower-layer identity of the first UE and the Link Identifier Update Request message is transmitted using the first lower-layer identity as a source;
        transmit a Link Identifier Update Response message to the first UE in response to
        reception of the Link Identifier Update Request message, wherein the Link Identifier Update Response message is transmitted using the first lower-layer identity as a destination; and
        continue, after the Link Identifier Update Response message is transmitted, to use the first lower-layer identity for examining the source of each sidelink data frame received from the first UE until a sidelink data frame with the source set to the new first lower-layer identity is received from the first UE, wherein only the new first lower-layer identity is used for receiving following one or more sidelink data frames after the sidelink data frame is received.

10. The second UE of claim 9, wherein the processor is further configured to execute a program code stored in the memory to:
use the first lower-layer identity as a source and the new first lower-layer identity as a source for filtering received sidelink data frames before a very first sidelink data frame with the new first lower-layer identity is received from the first UE or successful transmission of the Link Identifier Update Response message has been confirmed.

11. The second UE of claim 9, wherein the processor is further configured to execute a program code stored in the memory to:
use the new first lower-layer identity as a source for filtering received sidelink data frames after a very first sidelink data frame with the new first lower-layer identity is received from the first UE or successful transmission of the Link Identifier Update Response message has been confirmed.

12. The second UE of claim 9, wherein a lower-layer identity of the first lower-layer identity, the new first lower-layer identity, and/or the second lower-layer identity is a Layer-2 identity or a Layer-1 identity.

13. A first UE (User Equipment), comprising:
a processor; and
a memory operatively coupled to the processor, wherein the processor is configured to execute a program code stored in the memory to:
establish the sidelink unicast link with the second UE, wherein a first lower-layer identity of the first UE and a second lower-layer identity of the second UE are used for communicating between the first UE and the second UE via the sidelink unicast link;
transmit a Link Identifier Update Request message to the second UE, wherein the Link Identifier Update Request message includes a new first lower-layer identity of the first UE and the Link Identifier Update Request message is transmitted using the first lower-layer identity as a source;
receive a Link Identifier Update Response message from the second UE, wherein the Link Identifier Update Response message is transmitted using the first lower-layer identity as a destination; and
continue, after the Link Identifier Update Response message is received, to use the first lower-layer identity for examining the destination of each sidelink data frame received from the second UE until a sidelink data frame with the destination set to the new first lower-layer identity is received from the second UE, wherein only the new first lower-layer identity is used for receiving following one or more sidelink data frames after the sidelink data frame is received.

14. The first UE of claim 13, wherein the processor is further configured to execute a program code stored in the memory to:
use the first lower-layer identity as a destination and the new first lower-layer identity as a destination for filtering received sidelink data frames before a very first sidelink data frame with the new first lower-layer identity is received from the second UE.

15. The first UE of claim 13, wherein the processor is further configured to execute a program code stored in the memory to:
use the new first lower-layer identity as a destination for filtering received sidelink data frames after a very first sidelink data frame with the new first lower-layer identity is received from the second UE.

16. The first UE of claim 13, wherein a lower-layer identity of the first lower-layer identity, the new first lower-layer identity, and/or the second lower-layer identity is a Layer-2 identity or a Layer-1 identity.

* * * * *